(12) United States Patent
Kato et al.

(10) Patent No.: US 8,884,777 B2
(45) Date of Patent: Nov. 11, 2014

(54) MOBILE DEVICE INCLUDING A SOLAR BATTERY

(75) Inventors: Hiroshi Kato, Kanagawa (JP); Kimitaka Benise, Tokyo (JP); Jusuke Shimura, Kanagawa (JP); Yoshiaki Inoue, Aichi (JP); Yasuhide Hosoda, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 481 days.

(21) Appl. No.: 13/082,538

(22) Filed: Apr. 8, 2011

(65) Prior Publication Data

US 2011/0316715 A1 Dec. 29, 2011

Related U.S. Application Data

(60) Provisional application No. 61/358,708, filed on Jun. 25, 2010.

(51) Int. Cl.
*G08B 5/22* (2006.01)
*H02J 7/35* (2006.01)
*H04M 1/21* (2006.01)
*H04M 1/02* (2006.01)

(52) U.S. Cl.
CPC ............ *H04M 1/21* (2013.01); *H04M 2250/12* (2013.01); *H02J 7/35* (2013.01); *Y02E 10/566* (2013.01); *H04M 1/0214* (2013.01); *H02J 7/355* (2013.01)
USPC ................ 340/815.45; 340/815.4; 340/908.1; 340/425.5; 340/438; 340/458; 340/459; 340/461; 455/566; 455/572; 250/203.4; 250/205; 324/761.01; 320/101; 361/679.56; 354/175

(58) Field of Classification Search
USPC ........... 340/815.45, 815.4, 908.1, 425.5, 438, 340/458, 459, 461; 455/566, 572; 324/761.01; 320/101; 361/679.56; 354/175; 250/203.4, 205
See application file for complete search history.

(56) References Cited

U.S. PATENT DOCUMENTS

| | | | |
|---|---|---|---|
| 7,889,498 B2 * | 2/2011 | Diebel et al. | 361/679.56 |
| 8,008,887 B2 * | 8/2011 | Lee | 320/101 |
| 2009/0058353 A1 | 3/2009 | Jung | |
| 2010/0167797 A1 * | 7/2010 | Morichi | 455/572 |
| 2011/0012552 A1 * | 1/2011 | Margalit | 320/101 |
| 2011/0037600 A1 * | 2/2011 | Takehara et al. | 340/635 |
| 2011/0043241 A1 * | 2/2011 | Padula et al. | 324/761.01 |
| 2011/0319137 A1 * | 12/2011 | Takagi et al. | 455/566 |

FOREIGN PATENT DOCUMENTS

| | | |
|---|---|---|
| JP | 2006-33623 | 2/2006 |
| JP | 2007-124347 | 5/2007 |
| WO | WO 2008/149658 A1 | 12/2008 |

* cited by examiner

*Primary Examiner* — Benjamin C Lee
*Assistant Examiner* — Chico A Foxx
(74) *Attorney, Agent, or Firm* — Oblon, Spivak, McClelland, Maier & Neustadt, L.L.P.

(57) ABSTRACT

A mobile device including a solar battery having a light-receiving surface provided on a casing of the mobile device, an illuminance detector that detects an illuminance of light incident on the casing, an output section that outputs a state of light incident on the light-receiving surface of the solar battery, and a controller that controls the output section based on the illuminance detected by the illuminance detector.

10 Claims, 17 Drawing Sheets

FIG. 4

| STATE \ STATE DETECTION | STATE OF SOLAR BATTERY ||||
|---|---|---|---|---|
| | SOLAR BATTERY PANEL AT OBVERSE SIDE || SOLAR BATTERY PANEL AT REVERSE SIDE ||
| | BRIGHT | DARK | BRIGHT | DARK |
| OUTPUT — SOLAR BATTERY PANEL | ○ | × | × | × |
| OUTPUT — ILLUMINANCE-DETECTING LED | × | × | ○ | × |

FIG. 12A

| STATE | STATE DETECTION | SHADE PATTERN SP1 | SHADE PATTERN SP2 | SHADE PATTERN SP3 | SHADE PATTERN SP4 |
|---|---|---|---|---|---|
| OUTPUT | ILLUMINANCE-DETECTING LED 20A | × | ○ | × | ○ |
| | ILLUMINANCE-DETECTING LED 20B | × | ○ | ○ | × |
| | ILLUMINANCE-DETECTING LED 20C | ○ | × | × | ○ |
| | ILLUMINANCE-DETECTING LED 20D | ○ | × | ○ | × |

FIG. 12B

| STATE | STATE DETECTION | SHADE PATTERN SP1 | SHADE PATTERN SP2 | SHADE PATTERN SP3 | SHADE PATTERN SP4 |
|---|---|---|---|---|---|
| OUTPUT | EMISSION STATE OF LED 20A | BLINK | LIGHT UP | BLINK | LIGHT UP |
| | EMISSION STATE OF LED 20B | BLINK | LIGHT UP | LIGHT UP | BLINK |
| | EMISSION STATE OF LED 20C | LIGHT UP | BLINK | BLINK | LIGHT UP |
| | EMISSION STATE OF LED 20D | LIGHT UP | BLINK | LIGHT UP | BLINK |

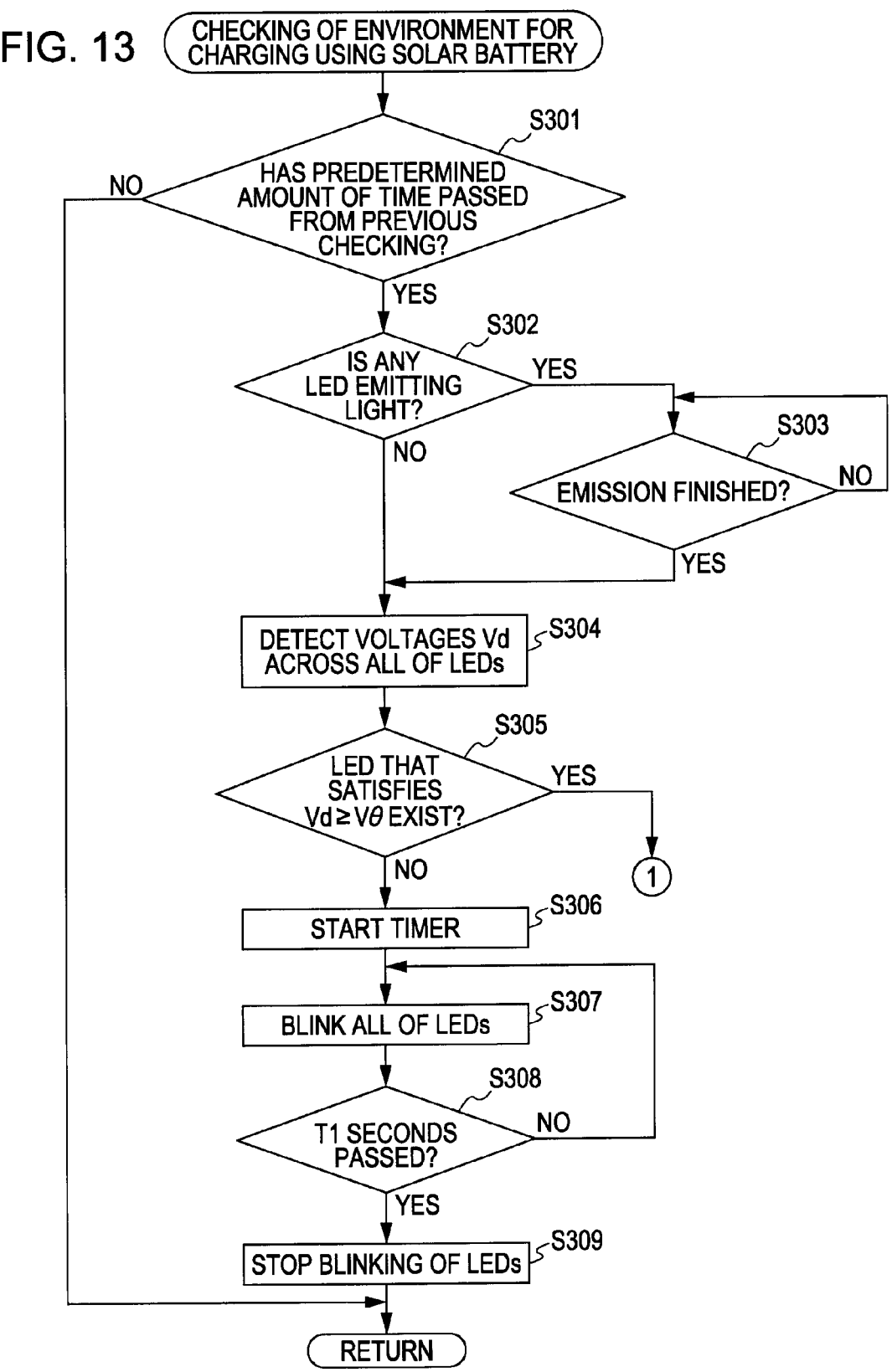

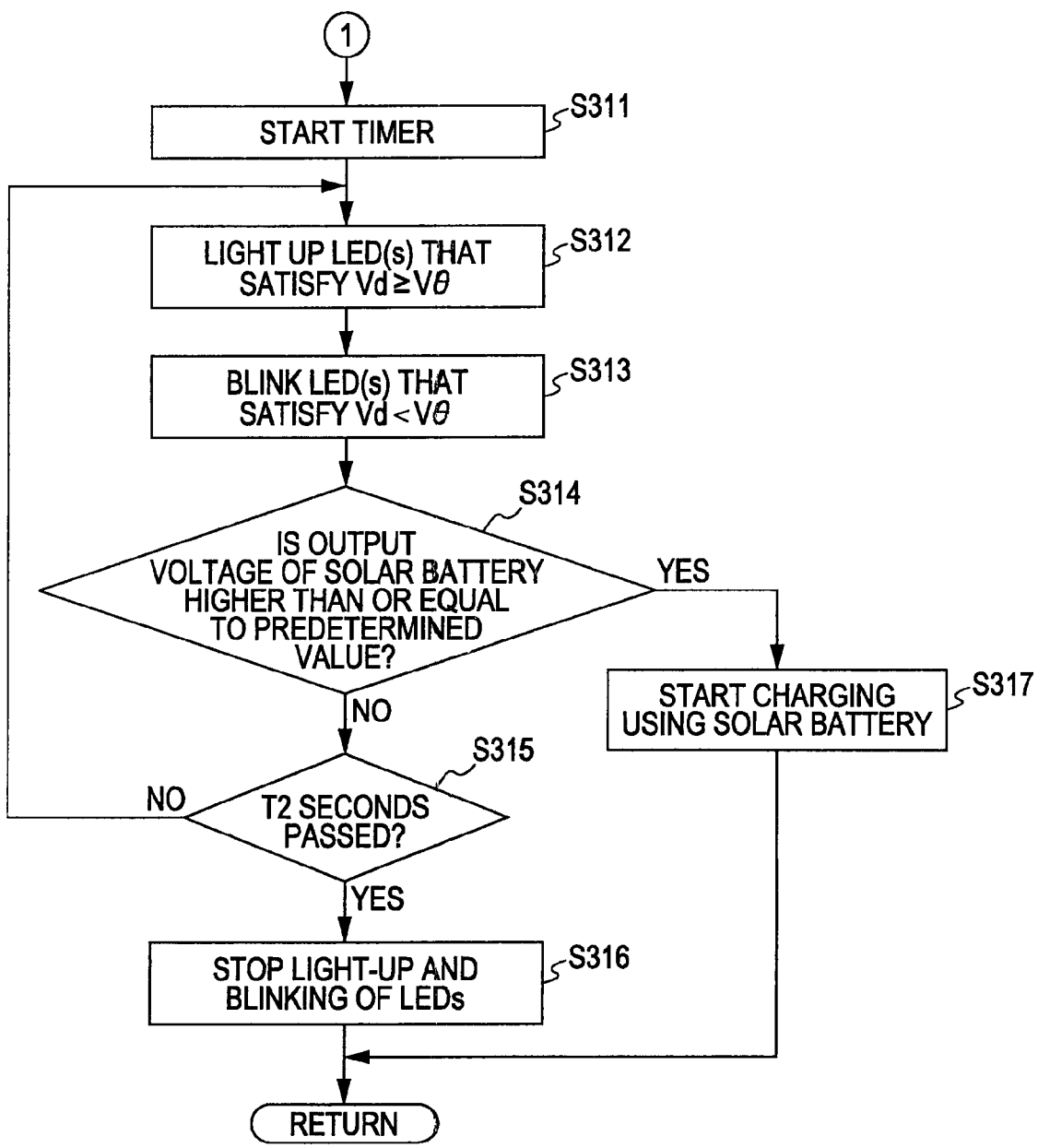

MOBILE DEVICE INCLUDING A SOLAR BATTERY

CROSS REFERENCE TO RELATED APPLICATION

This application claims the benefit of priority of Provisional Application Ser. No. 61/358,708, filed Jun. 25, 2010, the entire contents of which is incorporated herein by reference.

BACKGROUND OF THE INVENTION

1. Field of the Invention

The present invention relates to a mobile device provided with a solar battery.

2. Description of the Related Art

With improvements in the light-to-power conversion efficiencies of solar batteries, mobile devices, such as mobile phone terminals, equipped with solar batteries for energy saving are becoming widely used. Although some of such mobile devices use solar batteries as direct sources for supplying power-supply voltages, many typically have rechargeable batteries that are charged with electrical outputs of the solar batteries.

FIGS. 16 and 17 are diagrams showing examples of the configurations of simplified charging circuits. FIG. 16 shows an example of a simplified charging circuit when an output voltage of a solar battery 1 is higher than an output voltage of a rechargeable battery 2 when it is fully charged. In the example of FIG. 16, a voltage regulator 3 is connected between the solar battery 1 and the rechargeable battery 2.

FIG. 17 shows an example of a simplified charging circuit when an output voltage of a solar battery 1 is lower than an output voltage of a rechargeable battery 2 when it is fully charged. In the example of FIG. 17, the output voltage of the solar battery 1 is increased by a step-up circuit 4 to be higher than the output voltage of the rechargeable battery 2 when it is fully charged. The output voltage of the solar battery 1, the output voltage being increased by the step-up circuit 4, is supplied to the rechargeable battery 2 through a charging control circuit 5, so that the rechargeable battery 2 is charged.

When a solar battery is included in, for example, a mobile phone terminal, the maximum size of a solar battery panel that has the light-receiving surface of the solar battery is about 40 mm×70 mm. The light-to-power conversion efficiencies of currently available solar battery panels are about 10 to 15%. In general, the brightness (illuminance) of light that the solar battery panels receive from the Sun is about 100000 lux under the blazing summer sun and is about 30000 lux near the window when it is slightly overcast or it is sunny.

Thus, the illuminance of light (sunlight) received by the solar battery panel varies depending on the season and the weather, and as shown in FIG. 18, output current of the solar battery 1 varies greatly depending on the illuminance. As shown in FIG. 19, charging current from the charging circuit using the solar battery 1 to the rechargeable battery 2 also varies greatly depending on the brightness (illuminance) of light received by the solar battery panel.

When the rechargeable battery is charged using the solar battery under a condition as described above (including the size and the conversion efficiency of the solar battery panel), the charging current is about 30 to 70 mA, as can be seen from FIG. 19.

When the capacity of the rechargeable battery used for the mobile phone terminal is assumed to be, for example, 800 to 1000 mAh, it takes 12 to 33 hours until the rechargeable battery is fully charged from an empty state. Even though solar-battery-based charging is in many cases used as auxiliary charging, it is still preferable that the charging be performed efficiently and effectively.

In view of the foregoing situation, for example, Japanese Unexamined Patent Application Publication No. 10-239464 discloses a technology for controlling a device by using illuminance detecting means for detecting ambient brightness on the basis of an output of a solar battery. Japanese Unexamined Patent Application Publication No. 61-226396 discloses an artificial satellite having a pair of sun detectors provided on a single mounting base on a solar battery panel so as to perform attitude control.

SUMMARY OF THE INVENTION

When a mobile terminal is to be charged with a solar battery, a user directs the light-receiving surface of the solar battery for the mobile phone toward the direction of incident sunlight. However, since it takes a long time for the charging, the user continuously holding the mobile device in his or her hand is not practical. Thus, for example, the user places the mobile device near the window so that the light-receiving surface can receive as much sunlight as possible.

However, the direction in which sunlight is incident on the light-receiving surface varies with time as the Sun moves. Accordingly, one possible approach is that sun detectors are provided as in the case of Japanese Unexamined Patent Application Publication No. 61-226396 and the posture of the mobile phone is controlled so that the direction of the light-receiving surface of the solar battery changes in conjunction with the movement of the Sun. With such an approach, however, since a complicated mechanism, such as a posture-control mechanism, is generally necessary, there is a problem of increased cost.

On the other hand, the use of the technology disclosed in Japanese Unexamined Patent Application Publication No. 10-239464 makes it possible to detect ambient brightness and also makes it possible to report, to the user, for example, whether or not the current environment is suitable for charging. However, in the case of the technology disclosed in Japanese Unexamined Patent Application Publication No. 10-239464, for example, when the surface of a casing provided with a solar battery panel is shaded or is located at the opposite side of a surface exposed to sunlight, it is determined that the surroundings of the mobile phone is dark in spite of a sufficient amount of sunlight. Thus, even in an environment where charging can be performed to a sufficient level, there is a possibility that this environment is not utilized and the opportunity of charging is lost.

In view of the foregoing situation, it is desirable to provide a solar-battery-equipped mobile device that is capable of efficiently and appropriately utilizing incident light that is receivable by a solar battery panel.

In order to overcome the above-described problems, an embodiment of the present invention provides a mobile device. The mobile device includes a solar battery having a light-receiving surface provided on a casing of the mobile device, an illuminance detector that detects an illuminance of light incident on the casing, an output section that outputs a state of light incident on the light-receiving surface of the solar battery, and a controller that controls the output section based on the illuminance detected by the illuminance detector.

According to the present invention, since the user can recognize the state of incident light on the light-receiving surface of the solar battery via the output section, it is possible to provide a mobile device that can more efficiently and appropriately use incident light that can be received by the solar battery.

BRIEF DESCRIPTION OF THE DRAWINGS

FIG. 4 is a table illustrating operation of major sections of the mobile device according to the first embodiment of the present invention;

FIGS. 12A and 12B are tables illustrating the operation of the major sections of the mobile device according to the second embodiment of the present invention;

FIG. 13 is a flowchart illustrating part of the operation of the major sections of the mobile device according to the second embodiment of the present invention;

FIG. 14 is a flowchart illustrating part of the operation of the major sections of the mobile device according to the second embodiment of the present invention;

DESCRIPTION OF THE PREFERRED EMBODIMENTS

A mobile device according to embodiments of the present invention will be described below with reference to the accompanying drawings.

First Embodiment

Example of Mechanical Structure of Mobile Device

Figure 1A:
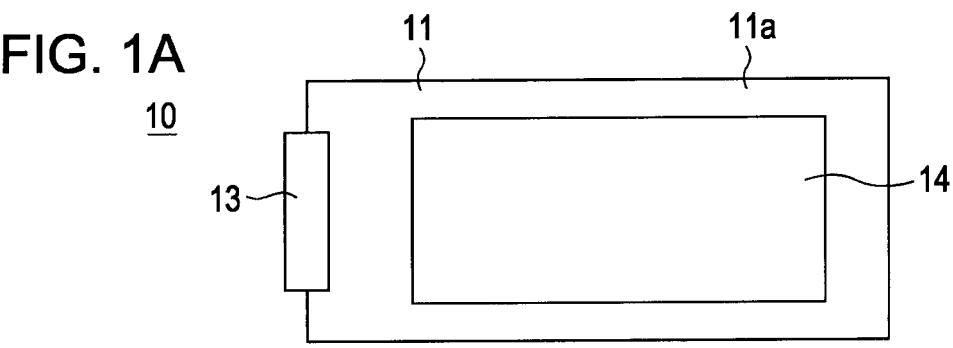
FIGS. 1A to 1D are schematic views illustrating an example of the mechanical structure of a mobile device according to a first embodiment of the present invention.
Figure 1B:
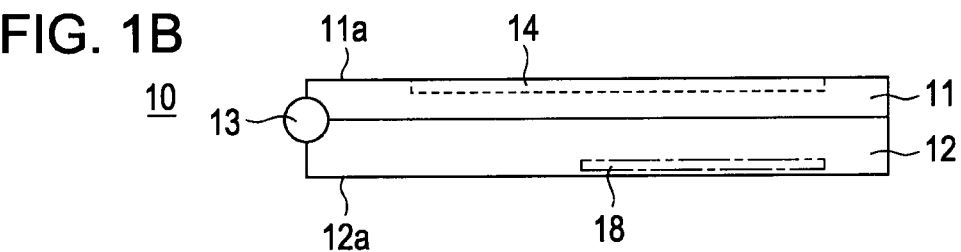
Figure 1C:
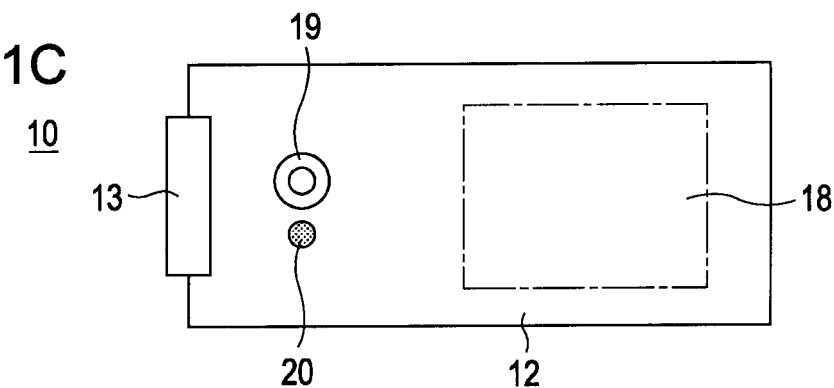
Figure 1D:
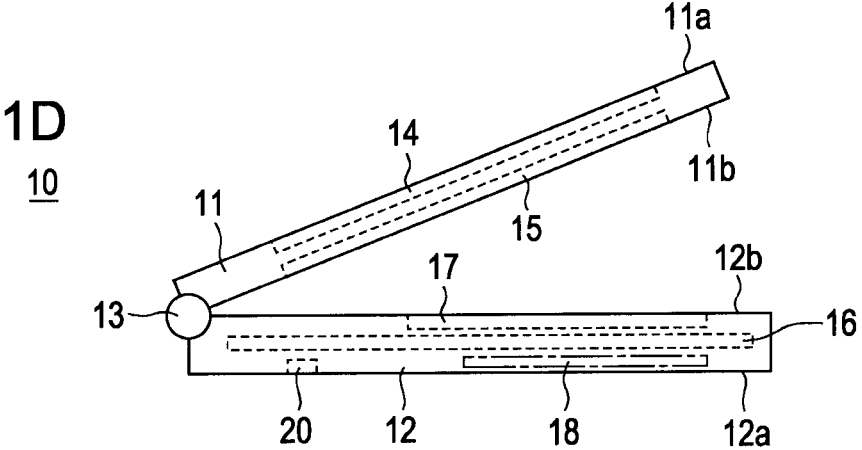

FIGS. 1A to 1D are schematic external views illustrating a mobile device according to a first embodiment of the present invention. In the present invention, the mobile device may be a mobile phone terminal 10. FIG. 1A is a top view of the mobile phone terminal 10, FIG. 1B is a right side view thereof, and FIG. 1C is a bottom view. The mobile phone terminal 10 in this example is a flip mobile phone. FIG. 1D shows a state in which the mobile phone terminal 10 is slightly opened from a folded state.

As shown in FIGS. 1A to 1D, the mobile phone terminal 10 has an upper casing 11 and a lower casing 12, which are coupled via a hinge portion 13. The upper casing 11 and the lower casing 12 are configured so that they can be pivoted using the hinge portion 13 as its pivot axis and thus can be opened/closed as shown in FIG. 1D.

As shown in FIGS. 1A, 1B, and 1D, the upper casing 11 has a solar battery panel 14 and a display device, which may be an LCD (liquid crystal display) 15 in this example. The solar battery panel 14 has a light-receiving surface for a solar battery.

The upper casing 11 has an upper rectangular flat surface 11a, which is exposed to the outside when the mobile phone terminal 10 is folded. The solar battery panel 14 is provided at the surface 11a in an exposed manner so as to be able to directly receive incident light. In practice, a surface of the solar battery panel 14 is protected by a transparent protection panel (not shown) made of a resin or the like. The LCD 15 is provided so that the display screen thereof is exposed at a surface 11b, which is located at an opposite side of the surface 11a of the upper casing 11.

As shown in FIGS. 1B, 1C, and 1D, the lower casing 12 has a printed circuit board 16 including circuit blocks of the mobile-phone terminal 10 and further has button keys 17 such as a numerical keypad and a cursor key, a rechargeable battery 18, a camera 19, and an LED (light-emitting diode) 20 for implementing a flash for the camera 19. As described below, in the first embodiment, the LED 20 also serves as an illuminance sensor for detecting brightness of external light that is incident on the casing (the lower casing 12) of the mobile phone terminal 10.

The lower casing 12 has a rectangular flat surface 12a, which is exposed to the outside when the mobile phone terminal 10 is folded. The camera 19 is attached to the surface 12a, with a lens of the camera 19 being exposed. Similarly, the LED 20 is also attached to the surface 12a of the lower casing 12, with a light-emitting surface of the LED 20 being exposed.

The button keys 17 are provided at a surface 12b, located at the opposite side of the surface 12a of the lower casing 12, in an exposed manner so as to be operable by a user. The rechargeable battery 18 is provided in the lower casing 12 so that the rechargeable battery 18 can be removed through removal of a lid portion (not shown) attached to the lower casing 12.

The lower casing 12 has a side surface provided with a terminal (not shown) for charging the rechargeable battery 18. When a charging adapter plugged into an AC (alternating current) power outlet is connected to the terminal for charging the rechargeable battery 18, the mobile phone terminal 10 according to the present embodiment can detect the connection and can automatically switch its operation mode to a mode in which charging is performed using the AC power voltage.

The solar battery panel 14 and the LCD 15 provided at the upper casing 11 are connected to the printed circuit board 16 via the hinge portion 13 by using via a flexible substrate (not shown). The button keys 17, the rechargeable battery 18, the camera 19, and the LED 20 provided at the lower casing 12 are connected to the printed circuit board 16 by soldering lead portions thereof.

The surface 11b of the upper casing 11 and the surface 12b of the lower casing 12 oppose each other in proximity to each other when the mobile phone terminal 10 is folded. Thus, when the mobile phone terminal 10 is folded, almost no external light is incident on the surfaces 11b and 12b.

Since the surface 11a of the upper casing 11 is exposed to the outside when the mobile phone terminal 10 is folded, it is possible to perform charging using an electrical output of the solar battery panel 14 by placing the folded mobile phone terminal 10 near a window or the like with the solar battery panel 14 being directed to the Sun.

However, when the folded mobile phone terminal 10 is placed with the surface 11a of the upper casing 11 being directed downward, no external light is incident on the solar battery panel 14 although the surface 12a of the lower casing 12 is exposed to external light.

<Example of Configuration of Electrical Circuit>

An example of the configuration of an electrical circuit of the mobile phone, which may be the mobile phone terminal 10, according to the first embodiment of the present invention will now be described with reference to FIG. 2.

In this example, the mobile phone terminal 10 has a controller 30 including a microcomputer. A mobile-phone circuit block 31, which includes a communication circuit block, a display circuit block for the LCD 15, and so on, is connected to the controller 30. Control signals output from the controller 30 are supplied to the circuit blocks in the mobile-phone circuit block 31.

An operation unit 32, which includes the button keys 17, is connected to the controller 30. The controller 30 determines whether or not any of the button keys 17 is operated by the user and executes control processing corresponding to the key operation.

When the user operates the button keys 17 to give an instruction for flash photography using the camera 19, the controller 30 supplies, to an LED-emission-drive-signal generating circuit 33, a flash-emission instruction signal for causing the LED 20 to emit a flash of light. Upon receiving the flash-emission instruction signal, the LED-emission-drive-signal generating circuit 33 generates a flash-emission drive signal and supplies it to an LED drive circuit 34.

Figure 2:
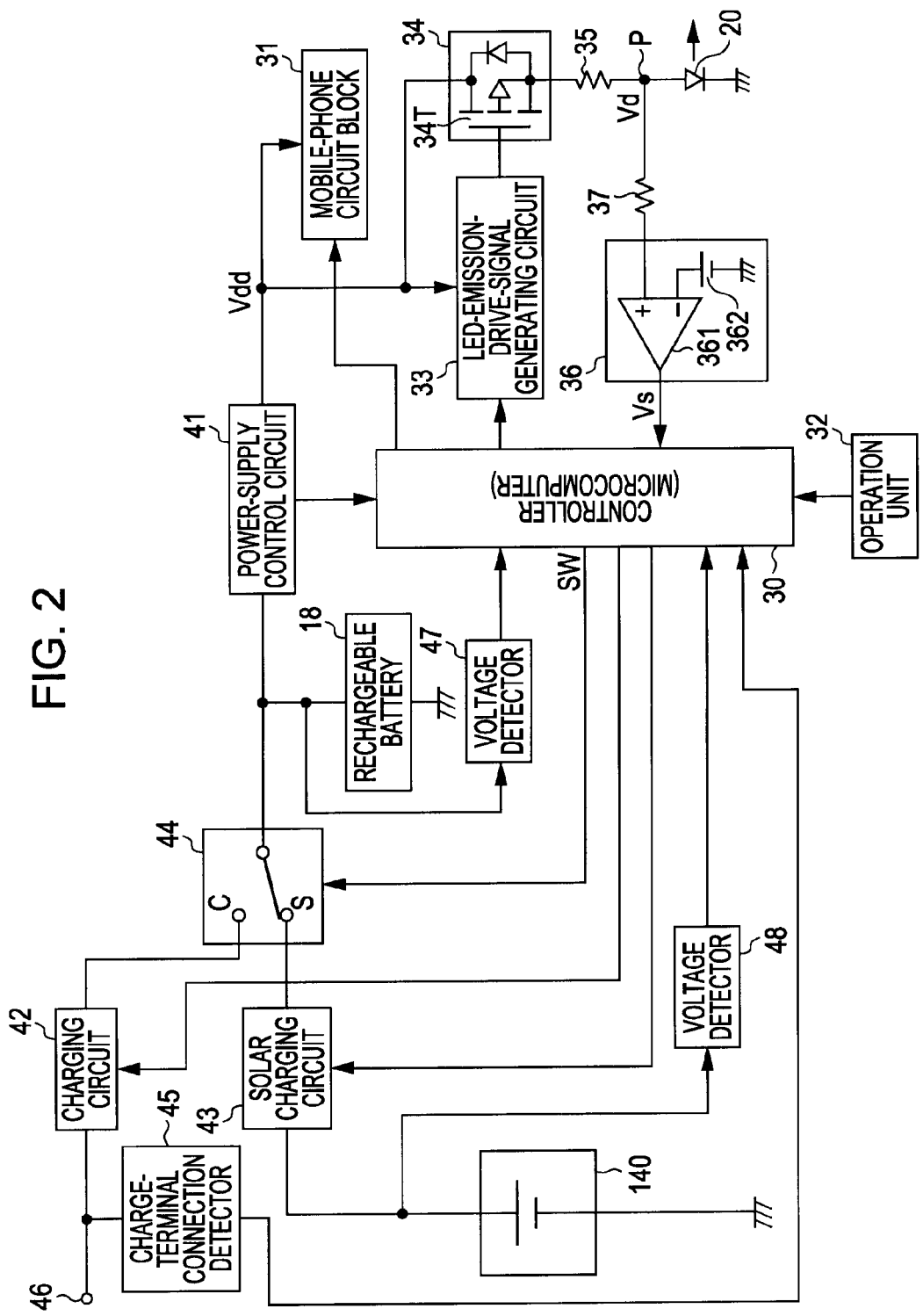
FIG. 2 is a block diagram illustrating an example of the configuration of an electrical circuit of the mobile device according to the first embodiment of the present invention.

In this example, the LED drive circuit 34 is implemented by an FET (field effect transistor) 34T, as shown in FIG. 2. A drain of the FET 34T is connected to a terminal at which a power supply voltage Vdd is obtained and a source of the FET 34T is connected to ground via a resistor 35 and the LED 20. When the flash-emission drive signal is output from the LED-emission-drive-signal generating circuit 33, it is supplied to the LED drive circuit 34 to turn on the FET 34T. Thus, current flows to the LED 20 through the resistor 35, so that the LED 20 emits a flash of light.

Figure 3A:
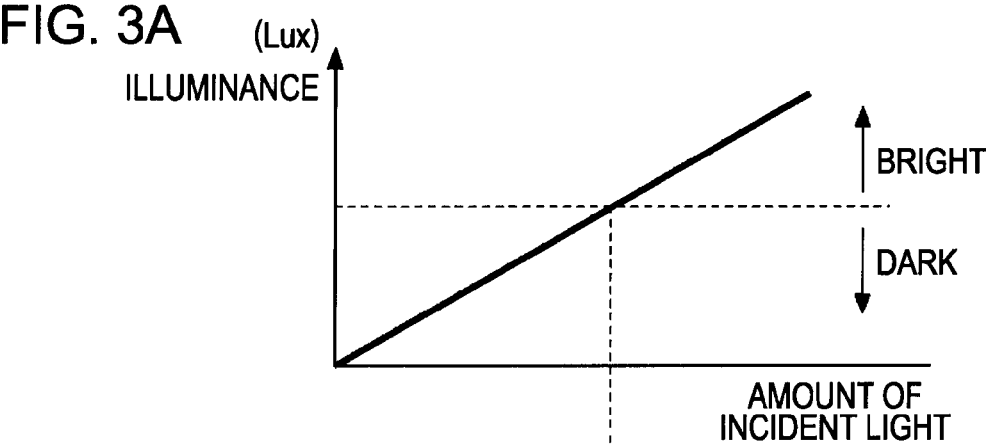
FIGS. 3A to 3C are graphs illustrating received-light versus output characteristics of an LED.
Figure 3B:
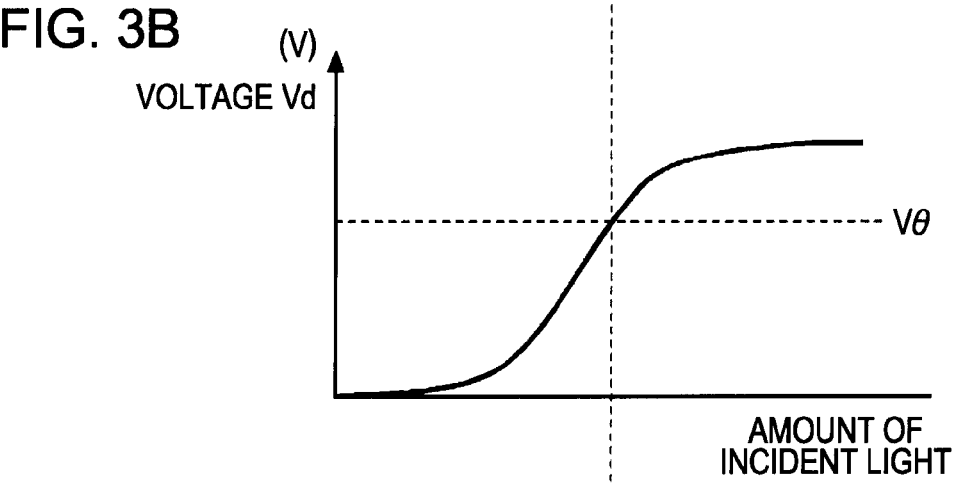

When the LED 20 is not emitting light, a voltage Vd corresponding to the amount of light (i.e., illuminance) that is incident on the LED 20 is generated across the LED 20. For example, when the amount of light that is incident on the LED 20 is linearly changed as shown in FIG. 3A, the voltage Vd across the LED 20 when it is not emitting light changes as shown in FIG. 3B. That is, the LED 20 can also operate as an illuminance sensor.

Thus, in the present embodiment, the voltage Vd obtained at a node P of the resistor 35 and the LED 20 is supplied to an illuminance detecting circuit 36 through a resistor 37. In the present embodiment, the illuminance detecting circuit 36 includes a comparing circuit 361 and a voltage generator 362. The voltage generator 362 generates a predetermined threshold voltage Vθ (see FIG. 3B). The comparing circuit 361 compares the voltage Vd with the threshold voltage Vθ. That is, in the present embodiment, the illuminance detecting circuit 36 performs binary detection as to whether or not the amount of incident light detected by the LED 20 is larger than the predetermined value, i.e., whether the ambient environment of the LED 20 is bright or dark.

Figure 3C:
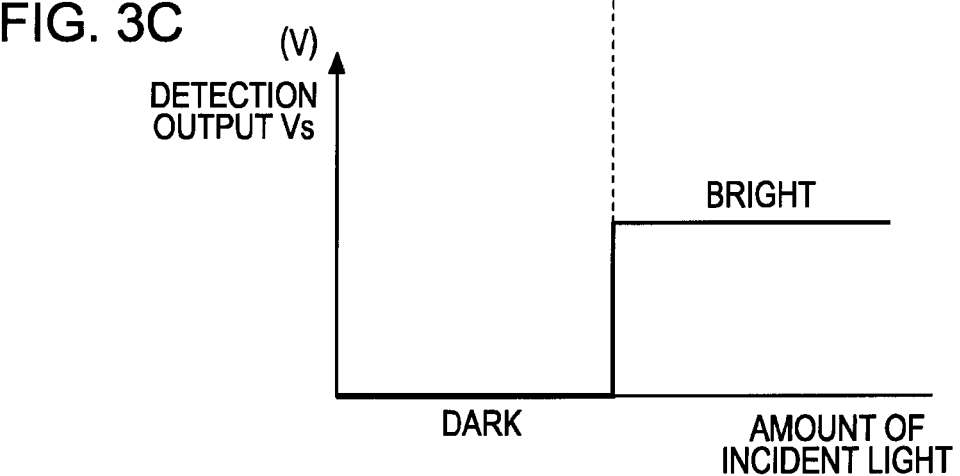

When the LED 20 is not emitting light, the controller 30 receives a detection output Vs (see FIG. 3C) of the illuminance detecting circuit 36 and uses the detection output Vs as an illuminance detection result of the ambient environment of the LED 20.

A power-supply control circuit 41 generates the power-supply voltage Vdd for the units having a circuit configuration as described above and supplies the generated power-supply voltage Vdd to the mobile-phone circuit block 31, the LED-emission-drive-signal generating circuit 33, the LED drive circuit 34, and the controller 30.

In the present embodiment, the rechargeable battery 18 serving as a power supply is provided as described above, and a voltage output from the rechargeable battery 18 is supplied to the power-supply control circuit 41. In the present embodiment, the rechargeable battery 18 can be charged with the AC power and also can be charged using a solar battery 140 including the solar battery panel 14.

A charging circuit 42 operates when the AC power is used and a solar charging circuit 43 operates when the solar battery 140 is used. The charging circuit 42 and the solar charging circuit 43 are connected to the rechargeable battery 18 via a switch circuit 44.

The charging circuit 42 is connected to a charge terminal 46. The charging adapter plugged into the AC power outlet is connected to the charge terminal 46. When the charging adapter plugged into the AC power outlet is connected to the charge terminal 46, a charge-terminal connection detector 45 detects the connection and supplies a detection output thereof to the controller 30. When the detection output supplied from the charge-terminal connection detector 45 indicates that the charging adapter plugged into the AC power outlet is connected to the charge terminal 46, the controller 30 outputs a switching signal SW to the switch circuit 44 to switch the connection of the switch circuit 44 to a terminal C so as to connect the charging circuit 42 to the rechargeable battery 18.

When the detection output supplied from the charge-terminal connection detector 45 indicates that the charging adapter plugged into the AC power outlet is not connected to the charge terminal 46, the controller 30 outputs a switching signal SW to the switch circuit 44 to switch the connection of the switch circuit 44 to a terminal S so as to connect the solar charging circuit 43 to the rechargeable battery 18.

In the present embodiment, when the rechargeable battery 18 is fully charged, the controller 30 stops the charging using the charging circuits 42 and 43. For that purpose, the output voltage of the rechargeable battery 18 is detected by a voltage detector 47 and the detected voltage is supplied to the controller 30. In this example, during charging using the charging circuit 42, when the output voltage of the rechargeable battery 18 is, for example, 4.2 V, the controller 30 determines that the rechargeable battery 18 is fully charged.

During charging using the solar charging circuit 43, when the output voltage of the rechargeable battery 18 is, for example, 4.0 V, which is lower than 4.2 V mentioned above, the controller 30 determines that the rechargeable battery 18 is fully charged. In an environment in which charging is performed using the solar charging circuit 43 for the solar battery 140, the casings of the mobile phone terminal 10 are generally heated by sunlight. In such an environment, when the rechargeable battery 18 is charged to a level in the vicinity of its practically fully charged voltage, problems may arise with the quality and durability of the rechargeable battery 18. Accordingly, in the present embodiment, during charging using the solar charging circuit 43, when the output voltage of the rechargeable battery 18 is, for example, 4.0 V (which is lower than the practically fully charged voltage), the controller 30 is adapted to determine that the rechargeable battery 18 is fully charged.

In the present embodiment, even in a case in which the connection of the switch circuit 44 is switched to the terminal S, when the output voltage of the solar battery 140 is lower than a predetermined value, for example, is lower than 4.5 V, the value of the output voltage may be insufficient to charge the rechargeable battery 18. Accordingly, in the present embodiment, when the output voltage of the solar battery 140 is lower than the predetermined value, the rechargeable battery 18 is not charged using the solar charging circuit 43 and, only when the output voltage of the solar battery 140 is higher than or equal to the predetermined value, the rechargeable battery 18 is charged using the solar charging circuit 43. For that purpose, the output voltage of the solar battery 140 is detected by a voltage detector 48 and the detected voltage is supplied to the controller 30.

In the present embodiment, when the output voltage of the solar battery 140 is lower than the predetermined value, the controller 30 checks whether or not the state of illumination of sunlight that is incident on the solar battery panel 14 is inadequate and reports the result of the checking to the user. That is, in the present embodiment, when the surface 11a of the upper casing 11 of the mobile phone terminal 10, the surface 11a being provided with the solar battery panel 14, is located at a side opposite to the direction of incident sunlight, the incidence of the sunlight is in an inadequate state in which the incident light is not receivable by the solar battery panel 14 even though the sunlight is incident on the casing of the mobile phone terminal 10.

In the present embodiment, the LED 20 is provided at the surface 12a of the lower casing 12 of the mobile phone terminal 10, the surface 12a being located at the opposite side of the surface 11a of the upper casing 11. Accordingly, when the surface 11a of the upper casing 11 of the mobile phone terminal 10 is located at the side opposite to the direction of incident sunlight, the surface 12a of the lower casing 12 is located in the direction of incident sunlight and thus the LED 20 can receive the incident light.

Thus, the use of the LED 20 as an illuminance sensor makes it possible to detect the inadequate state in which incident light is not receivable by the solar battery panel 14 even though sunlight is incident on the casing of the mobile phone terminal 10.

That is, as shown in a table in FIG. 4, when the surface 11a provided with the solar battery panel 14 is located at the obverse side on which sunlight can be incident and the ambient environment is bright (e.g., when it is sunny), the output voltage of the solar battery 140 increases but the voltage Vd across the LED 20 serving as an illuminance sensor decreases. When the surface 11a provided with the solar battery panel 14 is located at the obverse side on which sunlight can be incident and the ambient environment is dark (e.g., when it is cloudy or rainy), both of the output voltage of the solar battery 140 and the voltage Vd across the LED 20 serving as an illuminance sensor decrease.

In addition, when the surface 11a provided with the solar battery panel 14 is located at the reverse side opposite to the obverse side on which sunlight can be incident and the ambient environment is bright (e.g., when it is sunny), the output voltage of the solar battery 140 decreases and the voltage Vd across the LED 20 serving as an illuminance sensor increases. When the surface 11a provided with the solar battery panel 14 is located at the reverse side on which sunlight can be incident and the ambient environment is dark (e.g., when it is cloudy or rainy), both of the output voltage of the solar battery 140 and the voltage Vd across the LED 20 serving as an illuminance sensor decrease.

Thus, by checking the illuminance detection output Vs that is output from the illuminance detecting circuit 36 and that corresponds to the voltage Vd across the LED 20, the controller 30 can check whether or not the status of incidence of sunlight on the solar battery panel 14 of the mobile phone terminal 10 is the inadequate state.

In the present embodiment, the state in which the status of incidence of sunlight on the solar battery panel 14 is inadequate, for example, a state in which the surface 11a provided with the solar battery panel 14 is located at the reverse side opposite to the observe side on which sunlight can be incident, can be reported to the user through use of the emission state of the LED 20. That is, in this example, upon detecting an inadequate state as described above, the controller 30 supplies, to the LED-emission-drive-signal generating circuit 33, an LED-emission control signal for blinking the LED 20. In response to the LED-emission control signal, the LED-emission-drive-signal generating circuit 33 generates a signal for intermittently turning on/off the FET 34T in the LED drive circuit 34 and supplies the generated signal to the LED drive circuit 34. Consequently, the LED 20 intermittently emits light, i.e., blinks.

When the user sees the blinking of the LED 20, he or she can recognize that the status of incidence of sunlight on the solar battery panel 14 is the inadequate state. In the case of this example, upon recognizing the inadequate state, the user can start charging using sunlight by flipping the mobile phone terminal 10 so that the upper casing 11 side thereof is directed in the direction of incident sunlight.

The processing of the illuminance detecting circuit 36 shown in FIG. 2 may also be executed by the controller 30 as software processing. In such a case, the voltage Vd across the LED 20 is subjected to analog-to-digital conversion and the resulting voltage is input to the controller 30.

<Example of Processing Operation>

Figure 5:
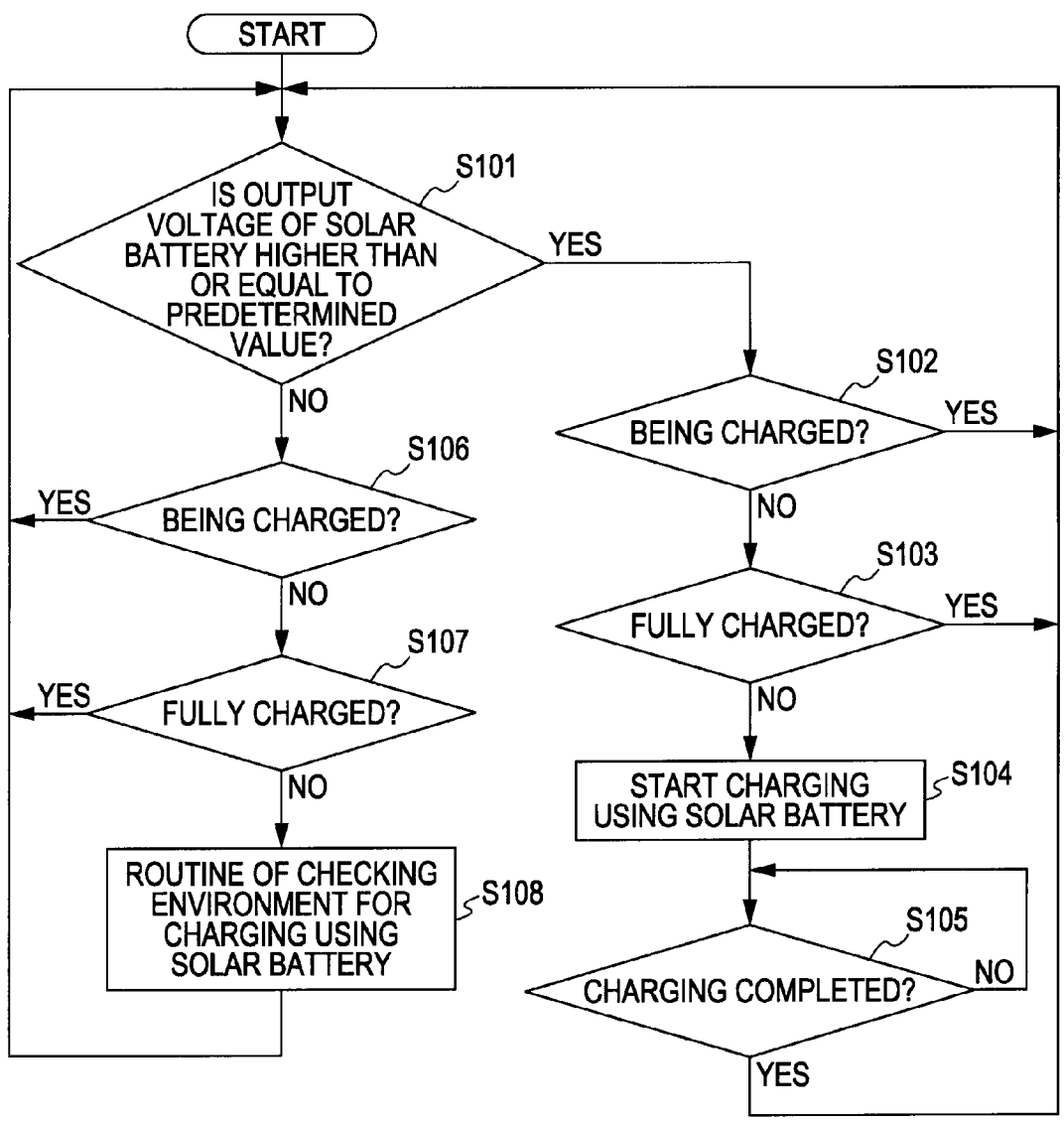
FIG. 5 is a flowchart illustrating operation of the major sections of the mobile device according to the first embodiment of the present invention.
Figure 6:
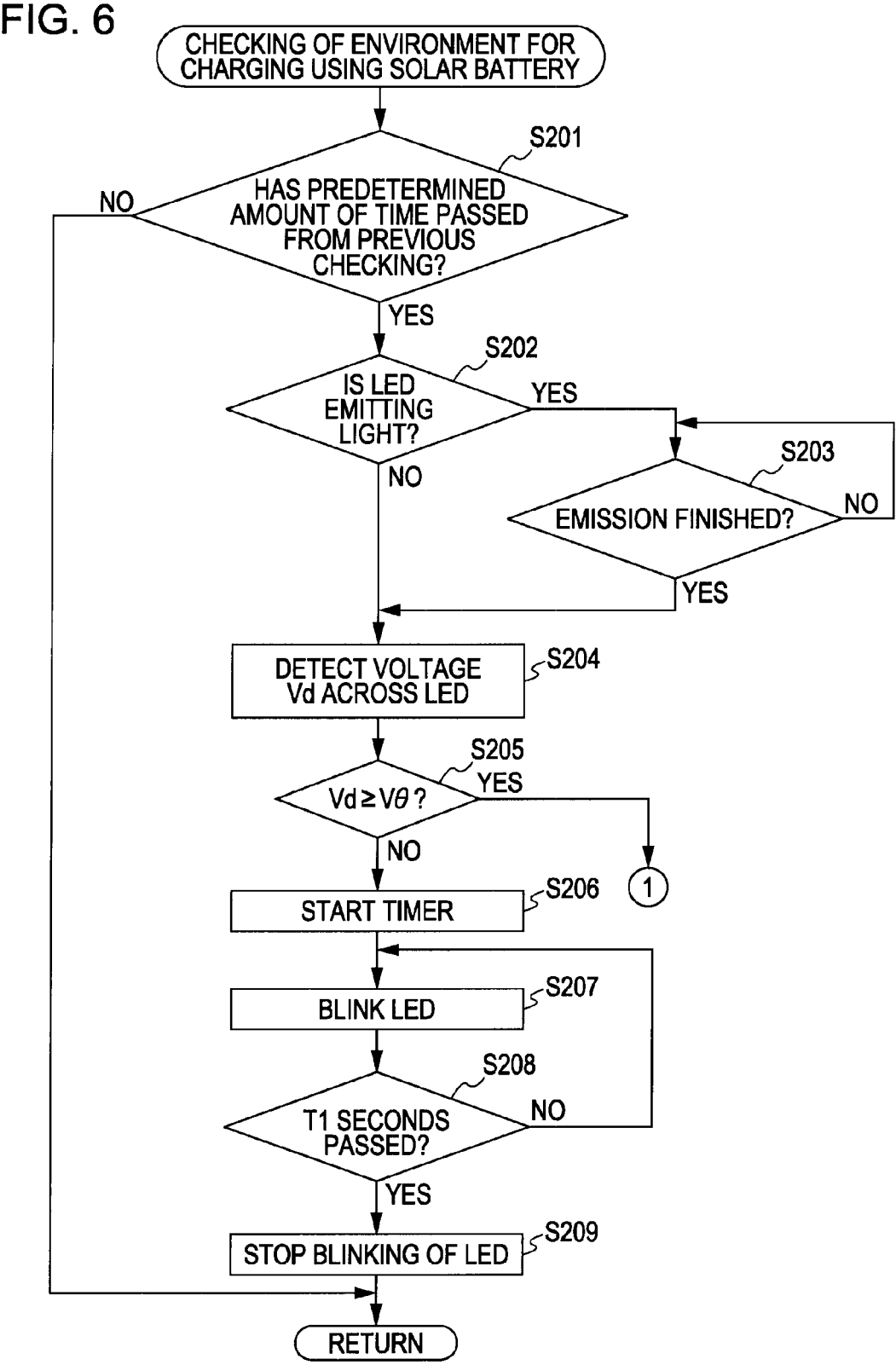
FIG. 6 is a flowchart illustrating part of the operation of the major sections of the mobile device according to the first embodiment of the present invention.
Figure 7:
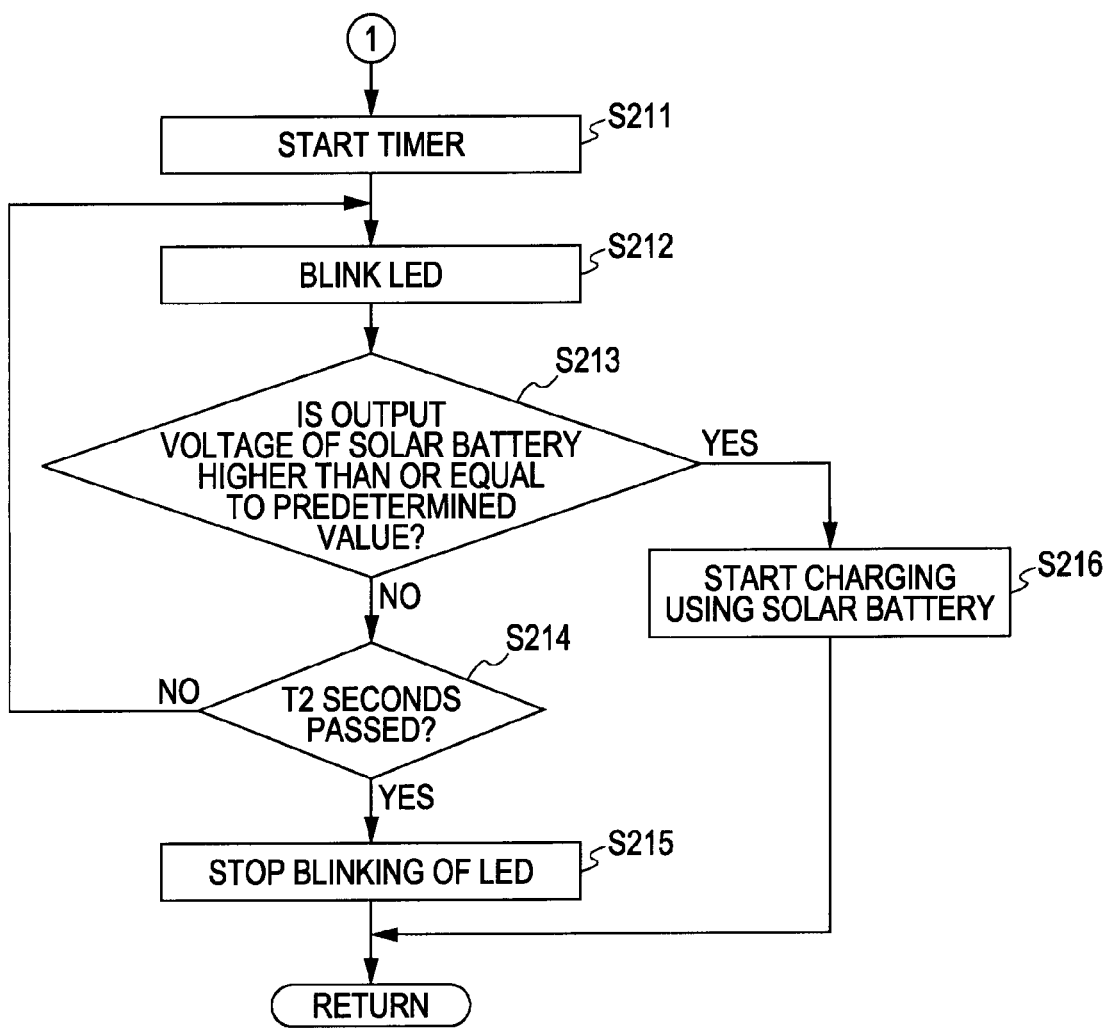
FIG. 7 is a flowchart illustrating part of the operation of the major sections of the mobile device according to the first embodiment of the present invention.

One example of a processing operation, performed by the controller 30, for controlling charging of the rechargeable battery 18 and checking the environment for charging the solar battery panel will now be described with reference to flowcharts shown in FIGS. 5 to 7. The processing of steps in the flowcharts shown in FIGS. 5 to 7 is executed by the microcomputer of the controller 30 as software processing.

First, in step S101, the controller 30 determines whether or not the output voltage of the solar battery 140 is higher than or equal to a predetermined value, which is 4.5 V in this example. When it is determined in step S101 that the output voltage of the solar battery 140 is higher than or equal to the predetermined value, the process proceeds to step S102 in which the controller 30 determines whether or not the rechargeable battery 18 is being charged using the charging circuit 42 or the solar charging circuit 43.

Upon determining in step S102 that the rechargeable battery 18 is being charged, the controller 30 returns to step S101. When it is determined in step S102 that the rechargeable battery 18 is not being charged, the process proceeds to step S103 in which the controller 30 determines whether or not the rechargeable battery 18 is in a fully charged state in which the output voltage thereof is higher than or equal to a voltage fully charged using the solar charging circuit 43 and no more charging is necessary. When it is determined in step S103 that the rechargeable battery 18 is in the fully charged state, no more charging is necessary and thus the controller 30 returns to step S101.

When it is determined in step S103 that the rechargeable battery 18 is not in the fully charged state, the process proceeds to step S104 in which the controller 30 starts charging using the solar battery panel 14 via the solar charging circuit 43 upon confirming that the connection of the switch circuit 44 is switched to the terminal S. In step S105, the controller 30 waits for completion of the charging. When the charging is completed, the process returns to step S101.

When it is determined in step S101 that the output voltage of the solar battery 14 is lower than the predetermined value, the process proceeds to step S106 in which the controller 30 determines whether or not the rechargeable battery 18 is being charged using the charging circuit 42 or the solar charging circuit 43.

Upon determining in step S106 that the rechargeable battery 18 is being charged, the controller 30 returns to step S101. When it is determined in step S106 that the rechargeable battery 18 is not being charged, the process proceeds to step S107 in which the controller 30 determines whether or not the rechargeable battery 18 is in the fully charged state in which the output voltage thereof is higher than or equal to the voltage fully charged using the solar charging circuit 43 and no more charging is necessary. When it is determined in step S107 that the rechargeable battery 18 is in the fully charged state, no more charging is necessary and thus the controller 30 returns to step S101.

When it is determined in step S107 that the rechargeable battery 18 is not in the fully charged state, the process proceeds to step S108 in which the controller 30 executes a routine for checking the environment for charging using the solar battery 140. The process then returns to step S101.

FIGS. 6 and 7 are flowcharts illustrating one example of checking the environment for charging using the solar battery 140. In the example shown in FIGS. 6 and 7, the processing of the illuminance detecting circuit 36 is executed by the controller 30 as software processing.

First, in step S201, the controller 30 determines whether or not a predetermined amount of time, for example, several tens of seconds to a several hundreds of seconds, has passed from previous checking. The amount of time measured in step S201 is, for example, about 600 seconds (10 minutes). When it is determined in step S201 that the predetermined amount of time has not passed from the previous checking, the controller 30 ends this processing routine and returns to the main routine shown in FIG. 5.

When it is determined in step S201 that the predetermined amount of time has passed from the previous checking, the process proceeds to step S202 in which the controller 30 determines that whether or not the LED 20, which also serves as an illuminance sensor, is emitting light. When it is determined in step S202 that the LED 20 is emitting light, the process proceeds to step S203 in which the controller 30 waits for finishing of the emission.

When it is determined in step S202 that the LED 20 is not emitting light or when it is determined in step S203 that the emission of the LED 20 is finished, the process proceeds to step S204 in which the controller 30 reads and detects a voltage Vd across the LED 20. Next, in step S205, the controller 30 determines whether or not the voltage Vd across the LED 20 is higher than or equal to a threshold voltage Vθ. When it is determined that the voltage Vd across the LED 20 is lower than the threshold voltage Vθ, the process proceeds to step S206 in which the controller 30 starts a timer for T1 seconds (e.g., T1=3).

In step S207, the controller 30 supplies an LED-emission control signal to the LED-emission-drive-signal generating circuit 33 so as to blink the LED 20. Subsequently, in step S208, the controller 30 determines whether or not T1 seconds has passed. When T1 seconds has not passed, the process returns to step S207 and the controller 30 repeats the blinking of the LED 20.

When it is determined in step S208 that T1 seconds has passed, the process proceeds to step S209 in which the controller 30 stops the timer and also stops the supply of the LED-emission control signal to the LED-emission-drive-signal generating circuit 33 in order to stop the blinking of the LED 20. The controller 30 then ends this processing routine and returns to the main routine.

The processing in steps S202 to S209 described above is performed in an environment state in which the output voltage of the solar battery 140 is lower than the predetermined value, the voltage Vd across the LED 20 is lower than the threshold voltage, and the surroundings of the mobile phone terminal 10 is generally dark. In this environment state, in this example, the LED 20 blinks for, for example, three seconds to report, to the user, that incident light that enables charging is not received by the solar battery panel 14 and the environment for charging using the solar battery 140 is not ready.

When it is determined in step S205 that the voltage Vd is higher than or equal to the threshold voltage Vθ, the process proceeds to step S211 in FIG. 7. In step S211, a timer for T2 seconds (T2≠T1, e.g., T2=10) is started.

In step S212, the controller 30 supplies an LED-emission control signal to the LED-emission-drive-signal generating circuit 33 so as to blink the LED 20. The pattern of the blinking of the LED 20 in step S212 may be the same as the pattern of the blinking in step S207. Alternatively, for example, the cycle of the blinking or the time intervals of light-up and extinction may be varied so that the pattern of the blinking varies.

Next, in step S213, the controller 30 determines whether or not the output voltage of the solar battery 140 is higher than or equal to a predetermined value, which is 4.5 V in this example. The processing in step S213 is equivalent to determining whether or not the user who sees the blinking of the LED 20 in step S212 has performed position correction and posture correction on the mobile phone terminal 10 so that the solar battery panel 14 can appropriately receive sunlight.

When it is determined in step S213 that the output voltage of the solar battery 140 is lower than the predetermined value, the process proceeds to step S214 in which the controller 30 determines whether or not T2 seconds has passed. When T2 seconds has not passed, the process returns to step S212 and the controller 30 repeats the blinking of the LED 20.

When it is determined in step S214 that T2 seconds has passed, the process proceeds to step S215 in which the controller 30 stops the supply of the LED-emission control signal to the LED-emission-drive-signal generating circuit 33 in order to stop the blinking of the LED 20. The controller 30 then ends this processing routine and returns to the main routine.

When it is determined in step S213 that the output voltage of the solar battery 140 is higher than or equal to the predetermined value, the process proceeds to step S216 in which the controller 30 starts charging using the solar battery 140 via the solar charging circuit 43 upon confirming that the connection of the switch circuit 44 is switched to the terminal S. The controller 30 then ends this processing routine and returns to the main routine.

The processing in step S205 and the processing in steps S211 to S215 are performed when the voltage Vd across the LED 20 is higher than or equal to the threshold voltage Vθ and there is a possibility that the mobile phone terminal 10 is in a battery-chargeable environment state in which the surroundings thereof is bright, even though the output voltage of the solar battery 140 is lower than the predetermined value. In this environment state, in this example, the LED 20 is caused to blink for, for example, 10 seconds to report, to the user, that the incidence of sunlight is in the inadequate state in which sunlight is not appropriately incident on the solar battery panel 14 even though the surroundings is bright.

With this arrangement, the use who sees the blinking of the LED 20 notices that the mobile phone terminal 10 is placed upside down and sunlight is not appropriately incident on the solar battery panel 14, and thus he or she can flip and relocate the mobile phone terminal 10 so that the solar battery panel 14 can appropriately receive sunlight.

Although the LED 20 for the camera flash is also used as the illuminance sensor in the first embodiment described above, another LED for light-emitting and reporting purposes which is included in the mobile phone terminal 10 may also be used as the illuminance sensor. Needless to say, a dedicated sensor may be provided as the illuminance sensor. In such a case, it goes without saying that the illuminance sensor is not limited to an LED.

Although the LED serving as the illuminance sensor is used as the reporting means in the above-described embodiment, another LED for light-emitting and reporting purposes, other than the LED serving as the illuminance sensor, may also be used as the reporting means.

For example, the reporting means is not limited to light-emission-based reporting using a light-emitting indicator device, such as an LED, and may employ a buzzer, vibration, a voice message, or the like. For example, in the case of a mobile phone terminal, a vibrator for reporting an incoming call may be used as the reporting means. In addition, illumination, a buzzer, vibration, a voice message, and so on may also be combined to realize the reporting means.

Although the above description has been given of a case in which the processing routine for checking the environment for charging using the solar battery 140 is executed only when the output voltage of the solar battery 140 is lower than the predetermined value, the arrangement may also be such that the processing routine for checking the environment for charging using the solar battery 140 is executed regardless of the value of the output voltage of the solar battery 140.

Second Embodiment

A second embodiment is also directed to an example in which the mobile device is a mobile phone terminal 10 that is similar to the one according to the first embodiment.

In the first embodiment described above, the illuminance sensor is provided at the surface 12a of the lower casing 12, the surface 12a being located at the opposite side of the surface 11a of the upper casing 11 provided with the solar battery panel 14, to detect the inadequate state in which the solar battery panel 14 is located at the reverse side at which sunlight is not receivable and to report the inadequate state to the user.

In contrast, according to the second embodiment, illuminance sensors are provided at regions around the solar battery panel 14 at the surface 11a provided with the solar battery panel 14. The illuminance sensors check whether or not the solar battery panel 14 is shaded and reports the result of the checking to the user.

In the second embodiment, the illuminance sensors and the light-emitting devices for reporting the inadequate state of incidence of sunlight on the solar battery panel 14 are configured by the same LEDs. The LEDs may be implemented by LEDs pre-installed in the electronic device, as in the case of the first embodiment. In the second embodiment, however, the LEDs are implemented by dedicated LEDs.

<Example of Mechanical Structure of Mobile Device>

Figure 8A:
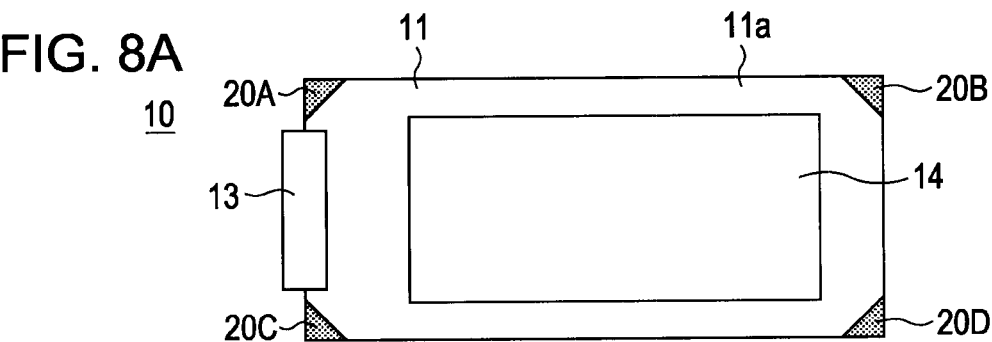
FIGS. 8A and 8B are schematic views illustrating an example of the mechanical structure of a mobile device according to a second embodiment of the present invention.
Figure 8B:
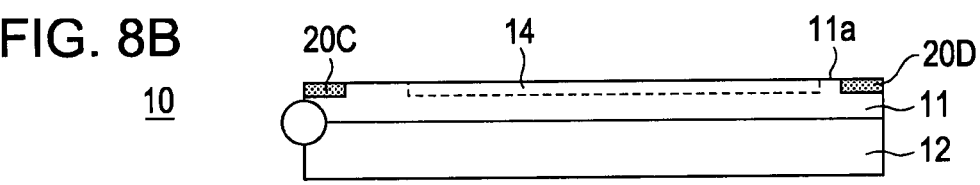

FIGS. 8A and 8B show a mobile phone terminal 10 according to the second embodiment. FIG. 8A is a top view of the mobile phone terminal 10 and FIG. 8B is a right side view thereof. As shown in FIGS. 8A and 8B, in the second embodiment, the solar battery panel 14 is provided at the surface 11a of the upper casing 11, as in the first embodiment, and four LEDs 20A, 20B, 20C, and 20D are provided at four corners of the surface 11a.

In the example of FIGS. 8A and 8B, not only are the four LEDs 20A, 20B, 20C, and 20D provided at the surface 11a of the upper casing 11 but also they extend partially to the side surface of the upper casing 11. With this structure, even when sunlight is incident obliquely or from the side-surface side, the sunlight can be received by the LEDs 20A, 20B, 20C, and 20D.

Figure 9A:
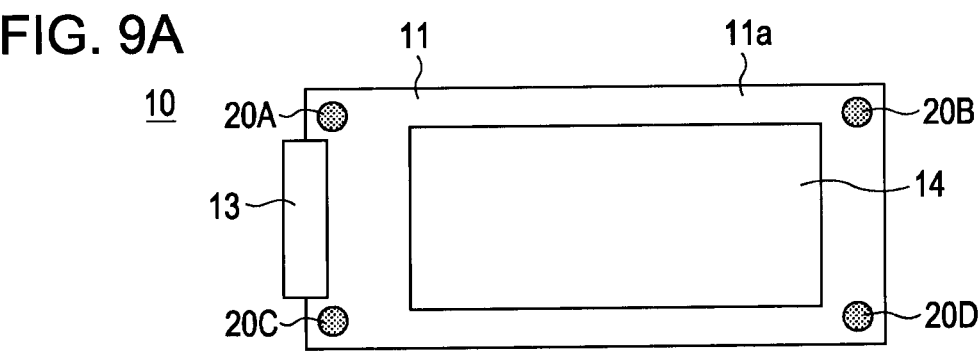
FIGS. 9A and 9B are schematic views illustrating another example of the mechanical structure of the mobile device according to the second embodiment of the present invention.
Figure 9B:
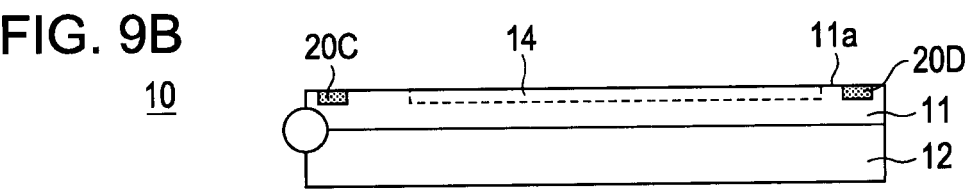

However, needless to say, each of the LEDs 20A, 20B, 20C, and 20D may be provided so as to be exposed at only the surface 11a of the upper casing 11, as shown in FIGS. 9A and 9B.

Since other structures of the mobile phone terminal 10 are substantially the same as those described in the first embodiment, the descriptions thereof are not given hereinafter.

<Example of Configuration of Electrical Circuit>

Figure 10:
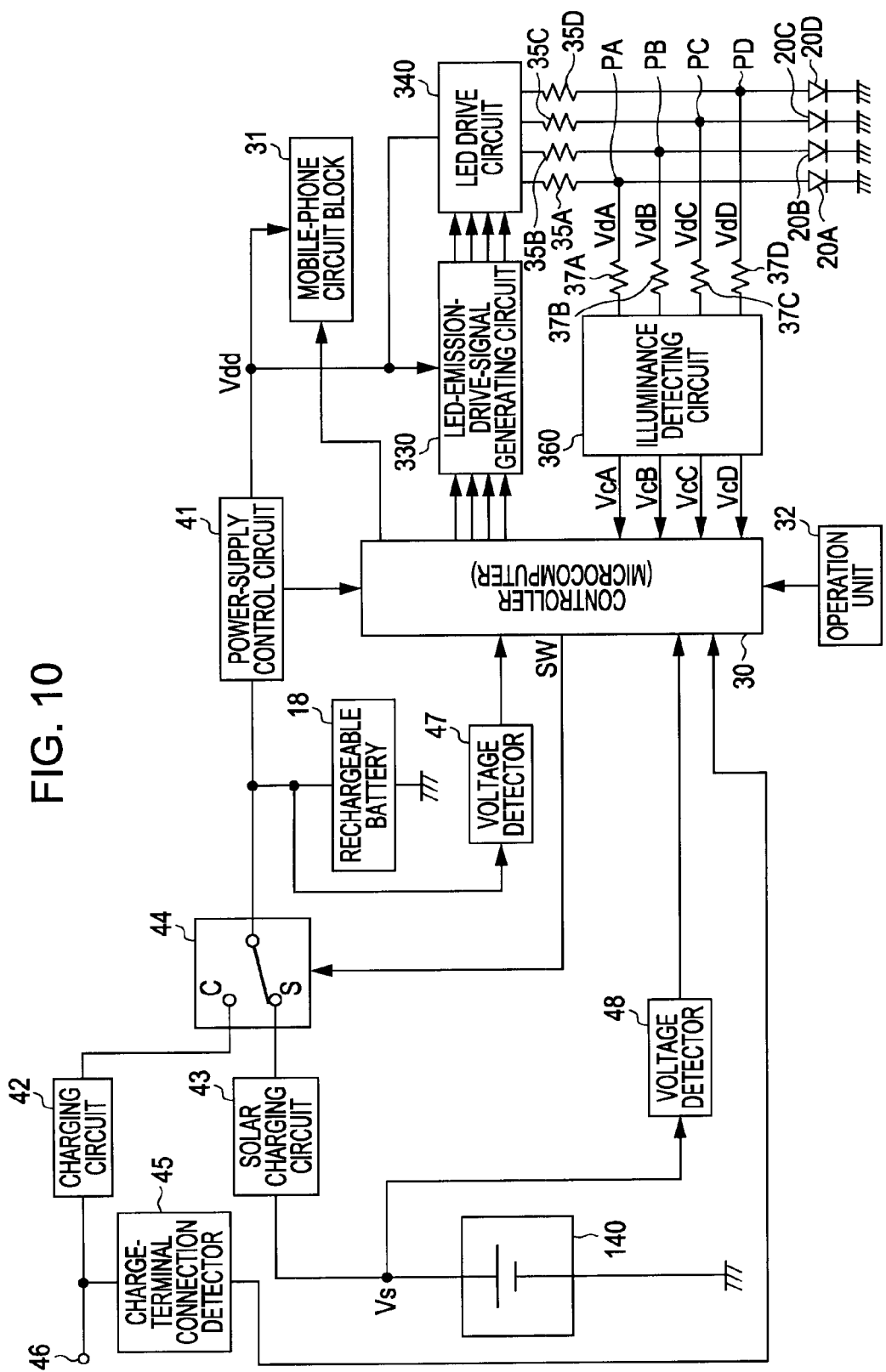
FIG. 10 is a block diagram illustrating an example of the configuration of an electrical circuit of the mobile device according to the second embodiment of the present invention.

FIG. 10 shows an example of the configuration of an electrical circuit of the mobile phone terminal 10 according to the second embodiment. As shown in FIG. 10, in the second embodiment, an LED-emission-drive-signal generating circuit 330, an LED drive circuit 340, and an illuminance detecting circuit 360 are provided instead of the LED-emission-drive-signal generating circuit 33, the LED drive circuit 34, and the illuminance detecting circuit 36 in the first embodiment.

The LED drive circuit 340 serves to drive emission of four LEDs 20A, 20B, 20C, and 20D, and this configuration is equivalent to the configuration in which the LED drive circuit 34 in the first embodiment is provided for the four LEDs 20A, 20B, 20C, and 20D.

The LED drive circuit 340 has FETs (not shown) for driving the LEDs 20A, 20B, 20C, and 20D. Sources of the FETs are connected to ground via resistors 35A, 35B, 35C, and 35D and the LEDs 20A, 20B, 20C, and 20D, respectively. All of drains of the FETs in the LED drive circuit 340 are connected to the power-supply terminal Vdd.

The configuration of the LED-emission-drive-signal generating circuit 330 is equivalent to a configuration in which the LED-emission-drive-signal generating circuit 33 in the first embodiment is provided for each of the four LEDs 20A, 20B, 20C, and 20D. The LED-emission-drive-signal generating circuit 330 receives, from the controller 30, emission control signals for the corresponding four LEDs 20A, 20B, 20C, and 20D and supplies, to the LED drive circuit 340, the emission control signals for the corresponding four LEDs 20A, 20B, 20C, and 20D.

In the present embodiment, a voltage VdA obtained at a node PA of the resistor 35A and the LED 20A is connected to the illuminance detecting circuit 360 via a resistor 37A, a voltage VdB obtained at a node PB of the resistor 35B and the LED 20B is connected to the illuminance detecting circuit 360 via a resistor 37B, a voltage VdC obtained at a node PC of the resistor 35C and the LED 20C is connected to the illuminance detecting circuit 360 via a resistor 37C, and a voltage VdD obtained at a node PD of the resistor 35D and the LED 20D is connected to the illuminance detecting circuit 360 via a resistor 37D.

The configuration of the illuminance detecting circuit 360 is equivalent to a configuration in which the illuminance detecting circuit 36 in the first embodiment is provided for each of the four LEDs 20A, 20B, 20C, and 20D. The illuminance detecting circuit 360 compares the voltages VdA, VdB, VdC, and VdD across the corresponding four LEDs 20A, 20B, 20C, and 20D with a threshold voltage Vθ to obtain comparison result outputs VcA, VcB, VcC, and VcD and supplies the comparison result outputs VcA, VcB, VcC, and VcD to the controller 30.

On the basis of the comparison result outputs VcA, VcB, VcC, and VcD, the output of the charge-terminal connection detector 45, and the outputs of the voltage detectors 47 and 48, the controller 30 performs charge control and executes a processing routine for checking the environment for charging using the solar battery 140.

The controller 30 checks the comparison result outputs VcA, VcB, VcC, and VcD from the illuminance detecting circuit 360 and performs control so as to light up the LED(s) across which the voltages VdA, VdB, VdC, and VdD are higher than or equal to the threshold voltage Vθ and so as to blink the LED(s) across which the voltages VdA, VdB, VdC, and VdD are lower than the threshold voltage Vθ.

In the second embodiment, when charging is not being performed in the mobile phone terminal 10 and the output voltage of the solar battery 140 is lower than a predetermined voltage, for example, is lower than 4.5 V, the processing routine for checking the environment for charging using the solar battery 140 is executed, as in the case of the first embodiment. The mobile phone terminal 10 in the second embodiment is configured so as to check an inadequate state in which part of the solar battery panel 14 is shaded even though sunlight is incident on the solar battery panel 14.

In general, the solar battery panel 14 is configured so that small solar battery cells are vertically and/or horizontally arranged and are connected in series. Thus, when part of the solar battery panel 14 is shaded, the amount of sunlight that is incident on the solar battery cells located at the shaded part becomes insufficient. Consequently, charging current obtained by the solar battery 140 decreases and the charge time increases. In the second embodiment, the inadequate state of light that is incident on the solar battery panel 14, the inadequate state being caused by shading as described above, is reported to the user.

Figure 11A:
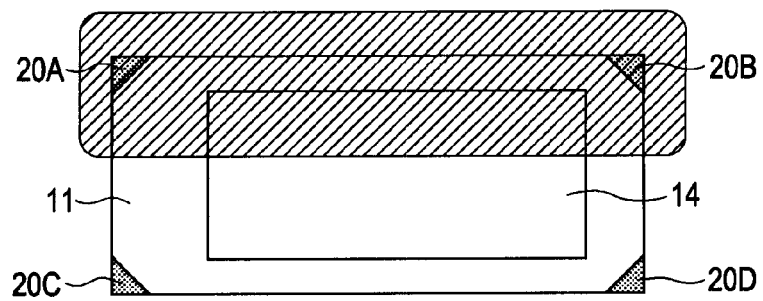
FIGS. 11A to 11C are schematic views illustrating operation of the major sections of the mobile device according to the second embodiment of the present invention.
Figure 11B:
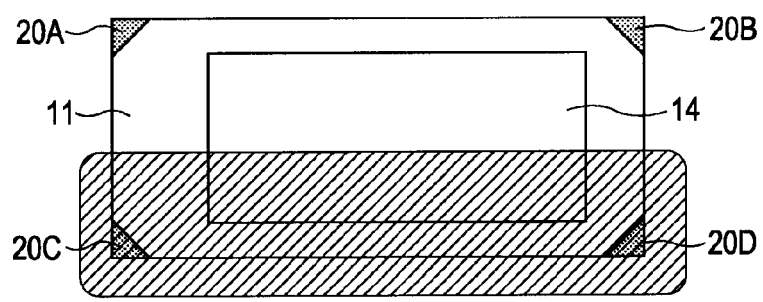
Figure 11C:
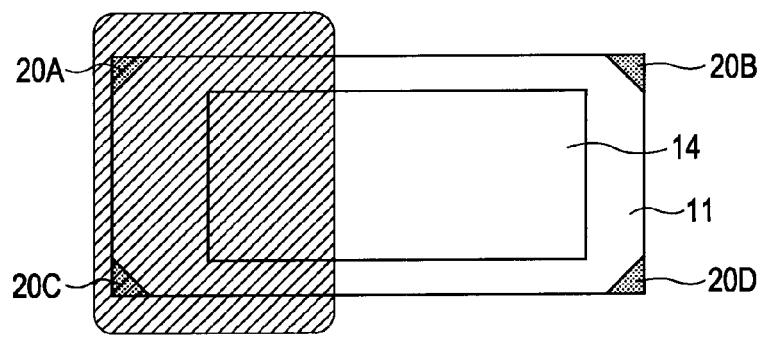

Now, processing for checking the environment for charging using the solar battery 140 will be described in conjunction with examples of shade patterns as shown in FIGS. 11A, 11B, and 11C.

FIG. 11A shows a first shade pattern SP1. In this pattern, the upper side in the lateral direction of the solar battery panel 14 is shaded and the LEDs 20A and 20B are within the shade.

In the case of the shade pattern SP1, the voltage VdA across the LED 20A and the voltage VdB across the LED 20B become lower than the threshold voltage Vθ, whereas the voltage VdC across the LED 20C and the voltage VdD across the LED 20D become higher than the threshold voltage Vθ.

Thus, the controller 30 checks the comparison result outputs VcA, VcB, VcC, and VcD from the illuminance detecting circuit 360 and performs control so as to light up the LEDs 20C and 20D across which the voltages VdC and VdD are higher than the threshold voltage Vθ and so as to blink the LEDs 20A and 20B across which the voltages VdA and VdB are lower than the threshold voltage Vθ.

The user who sees the light-up and blinking states of the LEDs 20A, 20B, 20C, and 20D can recognize a state in which, of the solar battery panel 14, an area adjacent to the LEDs 20A and 20B that are blinking is shaded and, of the solar battery panel 14, an area adjacent to the LEDs 20C and 20D that light up steadily is exposed to sunlight. Thus, the user can change the location of the mobile phone terminal 10 so that the sunlight is also incident on, of the solar battery panel 14, the area adjacent to the blinking LEDs 20A and 20B.

FIG. 11B shows a second shade pattern SP2. In this pattern, the lower side in the lateral direction of the solar battery panel 14 is shaded and the LEDs 20C and 20D are within the shade.

In the case of the shade pattern SP2, the voltage VdC across the LED 20C and the voltage VdD across the LED 20D become lower than the threshold voltage Vθ, whereas the voltage VdA across the LED 20A and the voltage VdB across the LED 2013 become higher than the threshold voltage Vθ. That is, the state of the voltages across the LEDs 20A and 20B and the state of the voltages across the LEDs 20C and 20D is opposite to the state in the case of the shade pattern SP1.

Thus, the controller 30 checks the comparison result outputs VcA, VcB, VcC, and VcD from the illuminance detecting circuit 360 in the case of the shade pattern SP2 and performs control so as to light up the LEDs 20A and 20B and so as to blink the LEDs 20C and 20D.

The user who sees the light-up and blinking states of the LEDs 20A, 20B, 20C, and 20D can recognize a state in which, of the solar battery panel 14, an area adjacent to the LEDs 20C and 20D that are blinking is shaded and, of the solar battery panel 14, an area adjacent to the LEDs 20A and 20B that light up steadily is exposed to sunlight. Thus, the user can change the location of the mobile phone terminal 10 so that the sunlight is also incident on, of the solar battery panel 14, the area adjacent to the blinking LEDs 20C and 20D.

FIG. 11C shows a third shade pattern SP3. In this pattern, the left side in the longitudinal direction of the solar battery panel 14 is shaded and the LEDs 20A and 20C are within the shade.

In the case of the shade pattern SP3, the voltage VdA across the LED 20A and the voltage VdC across the LED 20C become lower than the threshold voltage Vθ, whereas the voltage VdB across the LED 20B and the voltage VdD across the LED 20D become higher than the threshold voltage Vθ.

Thus, the controller 30 checks the comparison result outputs VcA, VcB, VcC, and VcD from the illuminance detecting circuit 360 in the case of the shade pattern SP3 and performs control so as to light up the LEDs 2013 and 20D and so as to blink the LEDs 20A and 20C.

The user who sees the light-up and blinking states of the LEDs 20A, 20B, 20C, and 20D can recognize a state in which, of the solar battery panel 14, an area adjacent to the LEDs 20A and 20C that are blinking is shaded and, of the solar battery panel 14, an area adjacent to the LEDs 20B and 20D that light up steadily is exposed to sunlight. Thus, the user can change the location of the mobile phone terminal 10 so that the sunlight is also incident on, of the solar battery panel 14, the area adjacent to the blinking LEDs 20A and 20C.

In a fourth shade pattern SP4 (not shown) in which the right side of the longitudinal direction of the solar battery panel 14 is shaded and the LEDs 20B and 20D are within the shade, the state of the light-up and blinking of the LEDs 20A, 20B, 20C, and 20D is opposite to the state in the case of the third shade pattern SP3.

FIG. 12A shows illuminance detection states of the LEDs 20A, 20B, 20C, and 20D in the case of the four shade patterns SP1 to SP4. Circle "○" indicates that the voltage across the LED is higher than or equal to the threshold voltage $V\theta$ and x indicates that the voltage across the LED is lower than the threshold voltage $V\theta$.

FIG. 12B shows emission states of the LEDs 20A, 20B, 20C, and 20D in the case of the four shade patterns SP1 to SP4.

Needless to say, the shade pattern is not limited to the above-described four patterns. Other possible examples include a state in which only one of the four LEDs is covered by a shadow and a state in which two diagonally located LEDs are covered by a shadow.

In the second embodiment, of the LEDs 20A, 20B, 20C, and 20D, the LEDs on which sunlight is incident light up steadily, even when the output voltage of the solar battery 140 is lower than the predetermined value. Thus, the user can recognize that, at least, the surrounding portions of the LEDs that light up steadily are in the battery-chargeable environment. The user can also recognize that sunlight is not appropriately incident on the surrounding portions of the blinking ones of the LEDs 20A, 20B, 20C, and 20D, because of shading or the like.

<Example of Processing Operation>

One example of a processing operation, performed by the controller 30 in the second embodiment, for controlling charging of the rechargeable battery 18 and checking the environment for charging the solar-batter panel will now be described with reference to flowcharts shown in FIGS. 13 and 14. Since the processing of a main routine in the second embodiment is analogous to the main routine (shown in FIG. 5) according to the first embodiment, the description thereof is not given hereinafter. The processing of steps in the flowcharts shown in FIGS. 13 and 14 is executed by the microcomputer of the controller 30 as software processing.

FIGS. 13 and 14 are flowcharts illustrating one example of a routine for checking an environment for charging using the solar battery 140 in the second embodiment. In the example shown in FIGS. 13 and 14, the processing of the illuminance detecting circuit 360 is executed by the controller 30 as software processing.

First, in step S301, the controller 30 determines whether or not a predetermined amount of time, for example, several tens of seconds to a several hundreds of seconds, has passed from previous checking. The amount of time measured in step S301 is, for example, about 600 seconds (10 minutes). When it is determined in step S301 that the predetermined amount of time has not passed from the previous checking, the controller 30 ends this processing routine and returns to the main routine show in FIG. 5.

When it is determined in step S301 that the predetermined amount of time has passed from the previous checking, the process proceeds to step S302 in which the controller 30 determines whether or not any of the LEDs 20A, 20B, 20C, and 20D is emitting light. When it is determined in step S302 that any of the LEDs 20A, 20B, 20C, and 20D is emitting light, the process proceeds to step S303 in which the controller 30 waits for finishing of the emission.

When it is determined in step S302 that any of the LEDs 20A, 20B, 20C, and 20D is not emitting light or when it is determined in step S303 that the emission of the LEDs 20A, 20B, 20C, and 20D is finished, the process proceeds to step S304 in which the controller 30 reads and detects all of the voltages Vd across the LEDs 20A, 20B, 20C, and 20D.

Next, in step S305, the controller 30 determines whether or not any of the LEDs 20A, 20B, 20C, and 20D across which the voltages VdA, VdB, VdC, and VdD are higher than or equal to the threshold voltage $V\theta$ exists. When it is determined that, of the LEDs 20A, 20B, 20C, and 20D, an LED across which the voltages VdA, VdB, VdC, and VdD are higher than or equal to the threshold voltage $V\theta$ does not exist, the process proceeds to step S306 in which the controller 30 starts a timer for T1 seconds (e.g., T1=3).

In step S307, the controller 30 supplies LED-emission control signals to the LED-emission-drive-signal generating circuit 33 so as to blink all of the LEDs 20A, 20B, 20C, and 20D.

Next, in step S308, the controller 30 determines whether or not T1 seconds has passed. When T1 seconds has not passed, the process returns to step S307 and the controller 30 repeats the blinking of all of the LEDs 20A, 20B, 20C, and 20D.

When it is determined in step S308 that T1 seconds has passed, the process proceeds to step S309 in which the controller 30 stops the timer and also stops the supply of the LED-emission control signals to the LEI)-emission-drive-signal generating circuit 330 in order to stop the blinking of the LEDs 20A, 20B, 20C, and 20D. The controller 30 then ends this processing routine and returns to the main routine.

The processing in steps S302 to S309 described above is performed in an environment state in which the output voltage of the solar battery 140 is lower than the predetermined value, the voltages Vd across the LEDs 20A, 20B, 20C, and 20D are lower than the threshold voltage $V\theta$, and the surroundings of the mobile phone terminal 10 is generally dark. In this environment state, in this example, all of the LEDs 20A, 20B, 20C, and 20D blink for, for example, three seconds to report, to the user, that incident light that enables charging is not received by the solar battery panel 14 and the environment for charging using the solar battery 140 is not ready.

When it is determined in step S305 that an LED or LEDs across which the VdA, VdB, VdC, and VdD are higher than or equal to the threshold voltage $V\theta$ exist, the process proceeds to step S311 in FIG. 14. In step S311, a timer for T2 seconds (T2≠T1, e.g., T2=10) is started.

In step S312, the controller 30 supplies the LED-emission control signal(s) to the LED-emission-drive-signal generating circuit 330 so as to light up the LED(s) across which the voltages VdA, VdB, VdC, and VdD are higher than or equal to the threshold voltage $V\theta$. In step S313, the controller 30 supplies the LED-emission control signal(s) to the LED-emission-drive-signal generating circuit 330 so as to blink the LED(s) across which the voltages VdA, VdB, VdC, and VdD are lower than the threshold voltage $V\theta$. The pattern of the blinking of the LED(s) in step S313 may be the same as the pattern of the blinking in step S307. Alternatively, for example, the cycle of the blinking or the time intervals of the light-up and extinction may be varied so that the pattern of the blinking varies.

Next, in step S314, the controller 30 determines whether or not the output voltage of the solar battery 140 is higher than or equal to the predetermined value, which is 4.5 V in this example. The processing in step S314 is equivalent to determining whether or not the user who sees the light-up and blinking of the LEDs 20A, 20B, 20C, and 20D in steps S312 and S313 has performed position correction and posture correction on the mobile phone terminal 10 so that the solar battery panel 14 can appropriately receive sunlight.

When it is determined in step S314 that the output voltage of the solar battery 140 is lower than the predetermined value, the process proceeds to step S315 in which the controller 30 determines whether or not T2 seconds has passed. When T2 seconds has not passed, the process returns to step S312.

When it is determined in step S315 that T2 seconds has passed, the process proceeds to step S316 in which the controller 30 stops the supply of the LED-emission control signals to the LED-emission-drive-signal generating circuit 330 in order to stop the light-up and blinking of the LEDs 20A, 20B, 20C, and 20D. The controller 30 then ends this processing routine and returns to the main routine.

When it is determined in step S314 that the output voltage of the solar battery 140 is higher than or equal to the predetermined value, the process proceeds to step S317 in which the controller 30 starts charging using the solar battery 140 via the solar charging circuit 43 upon confirming that the connection of the switch circuit 44 is switched to the terminal S. The controller 30 then ends this processing routine and returns to the main routine.

The processing in step S305 and the processing in steps S311 to S317 are performed when any one of the voltages Vd across the LEDs 20A, 20B, 20C, and 20D is higher than or equal to the threshold voltage $V\theta$ and there is a possibility that the mobile phone terminal 10 is in a battery-chargeable environment in which the surroundings thereof is bright, even though the output voltage of the solar battery 140 is lower than the predetermined value. In this environment state, in this example, the LEDs 20A, 20B, 20C, and 20D are caused to light up or blink for, for example, 10 seconds to report, to the user, that the incidence of sunlight is in the inadequate state in which sunlight is not appropriately incident on the solar battery panel 14 and it is shaded even though the surroundings is in the battery-chargeable environment.

Thus, the user who sees the light-up or blinking states of the LEDs 20A, 20B, 20C, and 20D can notice that sunlight is not appropriately incident on the solar battery panel 14, and thus can relocate the mobile phone terminal 10 so that the solar battery panel 14 can appropriately receive sunlight by moving the position of the mobile phone terminal 10 or changing the posture thereof.

Although the description in the second embodiment described above has been given of a case in which all of the LEDs that serve as both the illuminance sensors and the light-emitting indicators are dedicated LEDs, at least one of the LEDs may be implemented by an LED or LEDs used for other light-emitting indicators in the mobile phone terminal 10.

Although the description in the second embodiment described above has been given of a case in which four LEDs that serve as both illuminance sensors and light-emitting indicators are provided, the number of LEDs is not limited to thereto. For example, the number of LEDs that serves as both illuminance sensors and light-emitting indicators may be one or may be two or more. In addition, the positions at which the LEDs that serve as both the illuminance sensors and the light-emitting indicators are provided around the solar battery panel 14 are also not limited to the positions in above-described example.

Needless to say, the LEDs may be used as merely the reporting means that realizes light-emitting indicators and other dedicated sensors may also be provided as the illuminance sensors, as in the case of the first embodiment. In such a case, it goes without saying that the illuminance sensors are not limited to LEDs. When dedicated illuminance sensors are provided, the reporting means that realizes the light-emitting indicators is not limited to LEDs.

In the second embodiment, the reporting means is also not limited to light-emission-based reporting using light-emitting indicator devices, such as LEDs, and may employ a buzzer, vibration, a voice message, or the like. For example, in the case of a mobile phone terminal, a vibrator for reporting an incoming call may be used as the reporting means. In addition, illumination, a buzzer, vibration, a voice message, and so on may also be combined to realize the reporting means.

Although the above description has been given of a case in which the processing routine for checking the environment for charging using the solar battery 140 is executed only when the output voltage of the solar battery 140 is lower than the predetermined value, the arrangement in the second embodiment may also be such that the processing routine for checking the environment for charging using the solar battery 140 is executed regardless of the value of the output voltage of the solar battery 140.

Third Embodiment

Figure 15A:
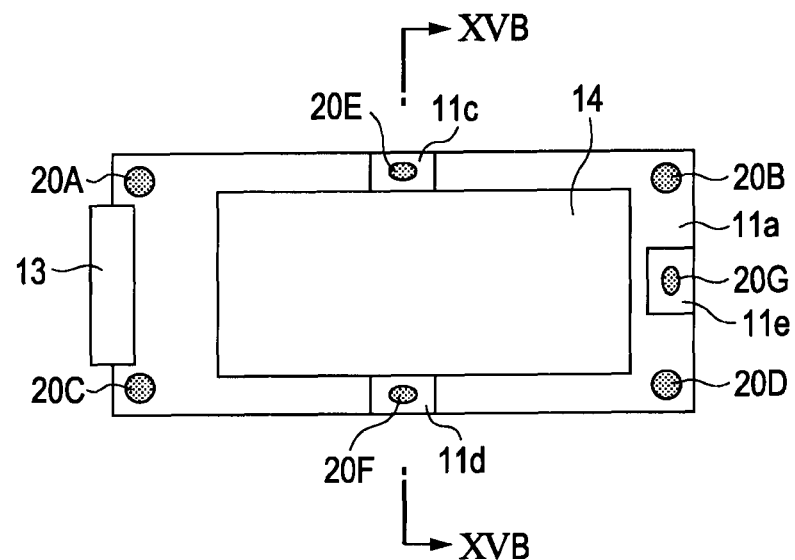
FIGS. 15A and 15B are schematic views illustrating one example of the mechanical structure of a mobile device according to a third embodiment of the present invention.
Figure 15B:
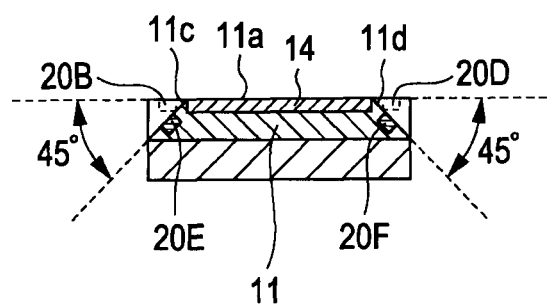
Figure 16:
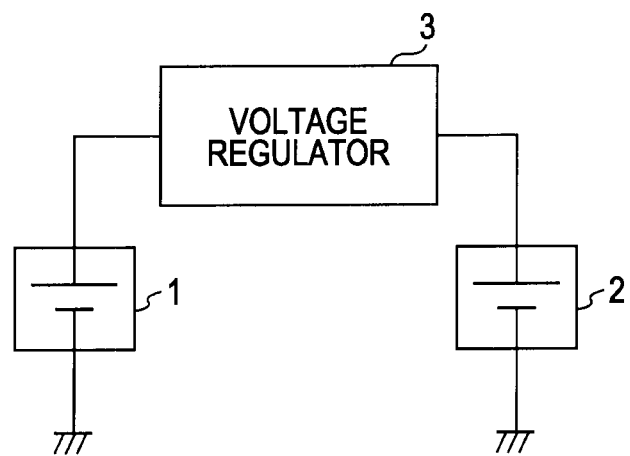
FIG. 16 is a block diagram illustrating one example of a battery charging circuit for a solar battery.
Figure 17:
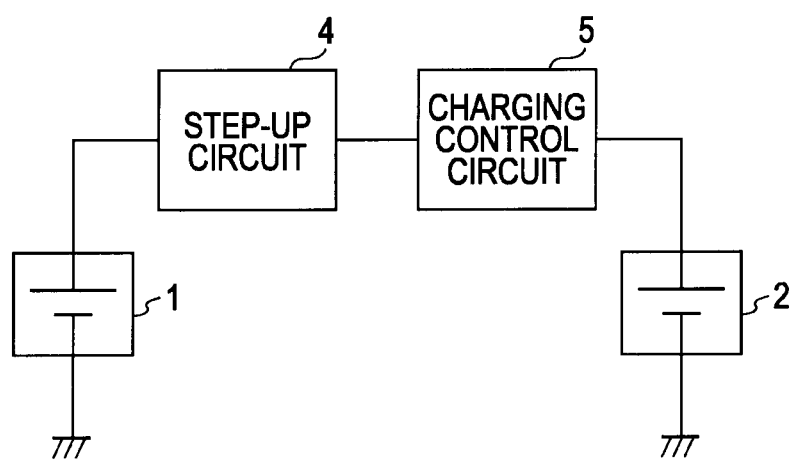
FIG. 17 is a block diagram illustrating another example of the battery charging circuit for a solar battery.
Figure 18:
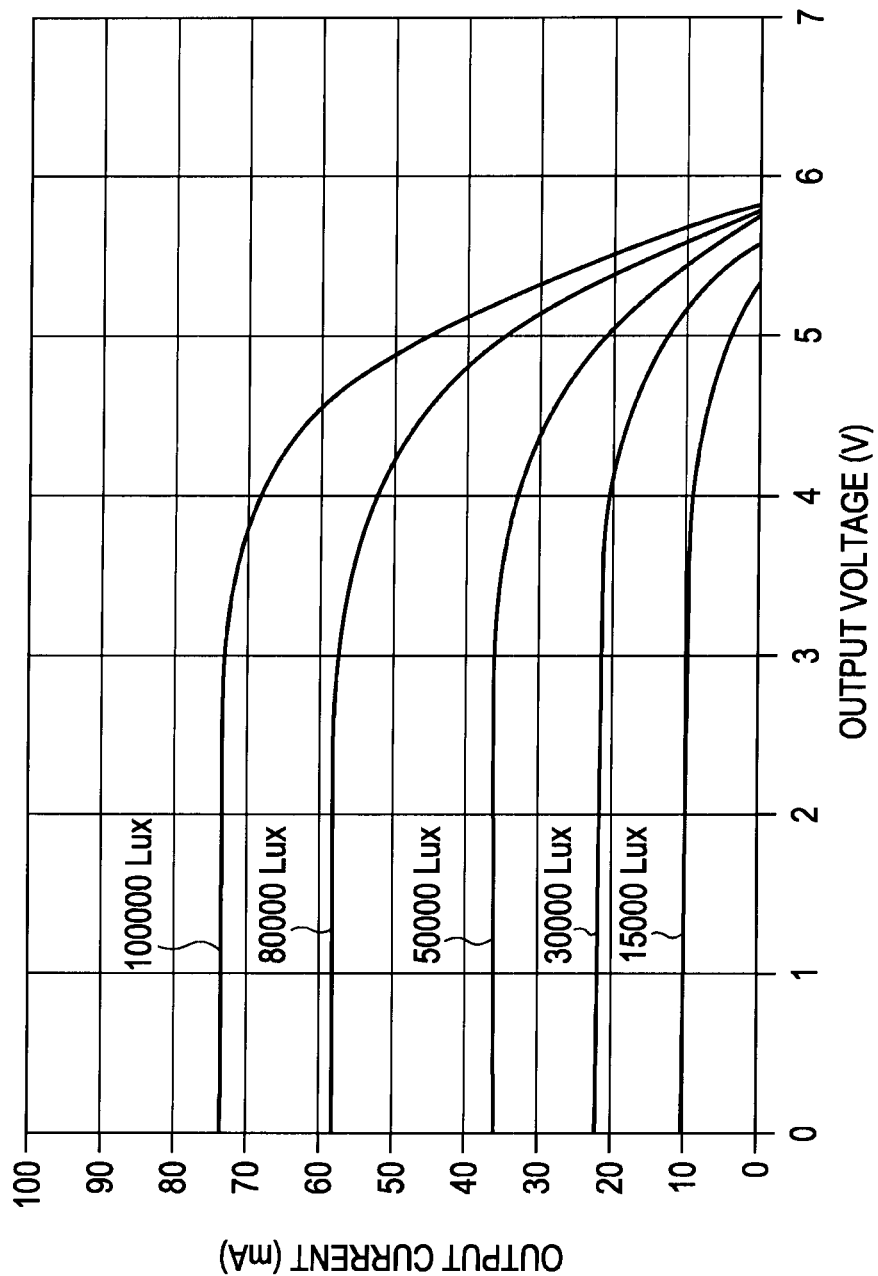
FIG. 18 is a graph showing output-voltage versus output-current characteristics of the solar battery with respect to illuminance at a solar battery panel.
Figure 19:
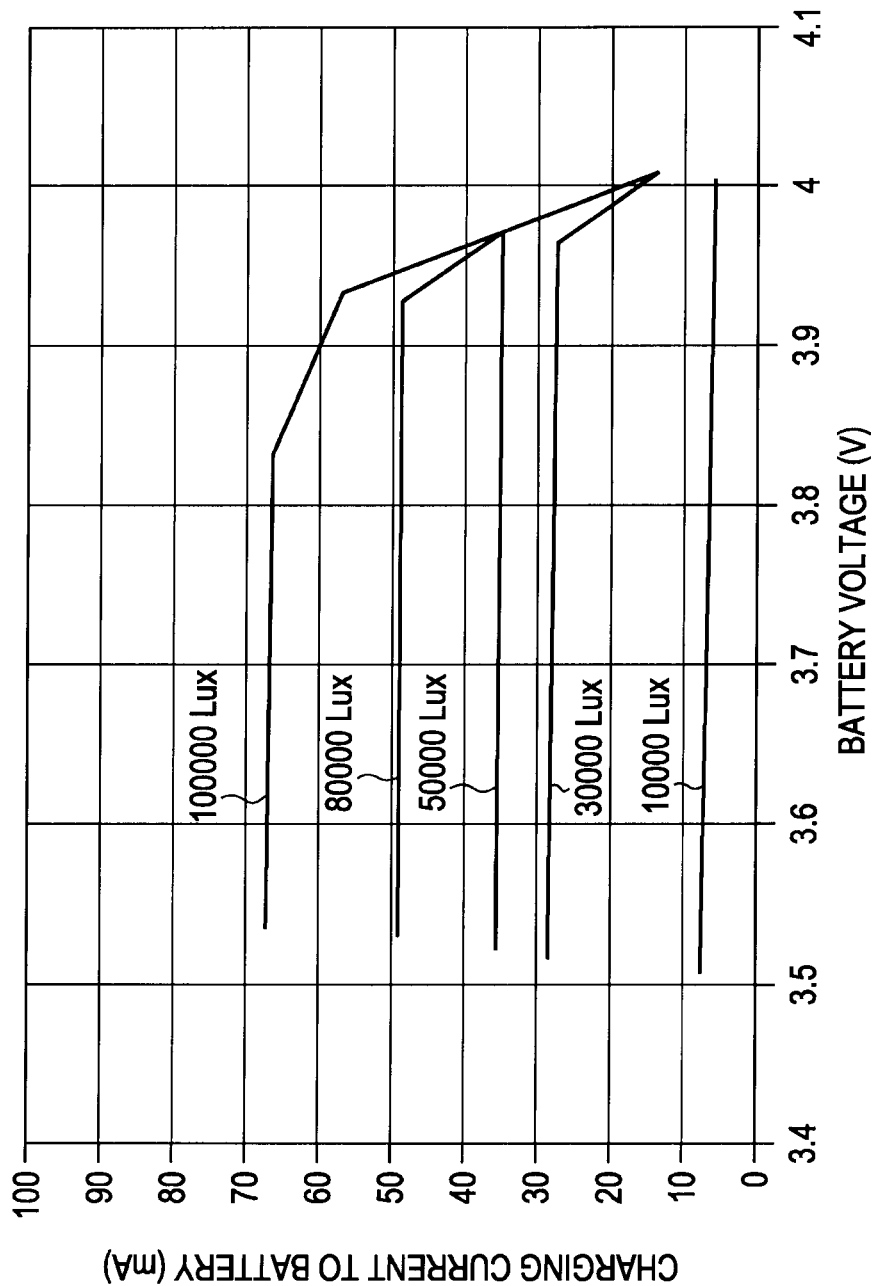
FIG. 19 is a graph illustrating charging current in the battery charging circuit for the solar battery with respect to illuminance at the solar battery panel.

FIGS. 15A and 15B show an example of the mechanical structure of a mobile phone terminal 10 according to a third embodiment. The third embodiment is an extended example of the second embodiment. In the case of the second embodiment described above, when sunlight is obliquely incident on the mobile phone terminal 10, there are cases in which the voltage(s) Vd across the LED(s) that serve as the illuminance sensor(s) do not become higher than the threshold voltage $V\theta$. According to the third embodiment, it is possible to check such sunlight that is obliquely incident.

FIG. 15A is a top view of the mobile phone terminal 10 according to the third embodiment and FIG. 15B is a cross sectional view taken along line XVB-XVB shown in FIG. 15A. In the third embodiment, the solar battery panel 14 is provided at the surface 11a of the upper casing 11, as in the first embodiment described above, and four LEDs 20A, 20B, 20C, and 20D are provided at four corners of the surface 11a, as in the second embodiment described above. In the third embodiment, emission of four LEDs 20A, 20B, 20C, and 20D is controlled by the controller 30, as in the second embodiment.

In the third embodiment, in the surrounding area of the solar battery panel 14 at the surface 11a of the upper casing 11, inclined surfaces 11c and 11d having inclination angles of, for example, 45°, as shown in FIG. 15B are provided at a position between the LED 20A and the LED 20B and at a position between the LED 20C and the LED 20D. LEDs 20E and 20F, each serving as both an illuminance sensor and a light-emitting indicator, are provided at the inclined surfaces 11c and 11d, respectively. In the surrounding area of the solar battery panel 14 at the surface 11a of the upper casing 11, an inclined surface 11e is provided at a position between the LED 20B and the LED 20D. An LED 20G that serves as an illuminance sensor and a light-emitting indictor is provided at the inclined surface 11e.

The controller 30 controls emission of the LEDs 20E, 20F, and 20G in the same manner as the four LEDs 20A, 20B, 20C, and 20D.

In the surrounding area of the solar battery panel 14 at the surface 11a of the upper casing 11, an inclined surface may further be provided at a position between the LED 20A and the LED 20C or at the hinge portion 13 so that an LED 20G that serves as both an illuminance sensor and a light-emitting indicator is provided at the inclined surface.

In the third embodiment, when sunlight is incident obliquely, the voltage Vd across the LED provided at the inclined surface located closer to a direction perpendicular to the incident direction is more likely to be higher than the threshold Vθ. Thus, for example, when the LED 20E lights up steadily while the LEDs 20A and 20B are blinking, the user can recognize that the blinking state of the LEDs 20A and 20B corresponds to the state in which sunlight is incident obliquely, not the state in the shade patter SP1.

The aforementioned inclination angles of the inclined surfaces 11c, 11d, and 11e are exemplary and are not limited to 45°. The inclination angles of the inclined surfaces 11c, 11d, and 11e may also be different from each other.

Other Embodiments and Modifications

Although the above description has been given of an example in which the illuminance sensor(s) are provided at the surface of the upper casing provided with the solar battery panel or at the surface opposite to that surface, the illuminance sensor(s) may also be provided at a side surface or side surfaces that are perpendicular to the surface provided with the solar battery panel.

Although the above-described embodiments have been directed to a case in which the mobile device is a mobile phone terminal, the mobile device may also be any other mobile device provided with a solar battery panel.

Although a case in which the mobile device has a rechargeable battery and the solar battery is used to charge the rechargeable battery has been described in the above embodiments, it goes without saying that the present invention is also applicable to a mobile device that has no rechargeable battery and that uses a solar battery as a power source.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile device comprising:
a solar battery having a light-receiving surface provided on a casing of the mobile device;
an illuminance detector, separate from the light-receiving surface, configured to detect an illuminance of light incident on the casing;
an output section configured to output a state of light incident on the light-receiving surface of the solar battery responsive to the illuminance detector; and
a controller configured to control the output section based on the illuminance detected by the illuminance detector, wherein
the illuminance detector comprises a plurality of light detectors provided on a same external surface of the casing as the light-receiving surface of the solar battery so as to detect illuminances at multiple positions in a surrounding area of the light-receiving surface of the solar battery;
the output section comprises a plurality of outputs, each at a position corresponding to a respective position of each of the plurality of light detectors to indicate to a user an availability status of solar battery charging light at the respective position, and
the controller is configured to control each of the plurality of outputs to be illuminated constantly when an illuminance detected at the position corresponding to the output is greater than or equal to a predetermined value, and control each of the plurality of outputs to blink when an illuminance detected at the position corresponding to the output is less than a predetermined value so that a combination of blinking and constantly illuminated output is indicative of light availability coming from a relative direction of the constantly illuminated output position towards the blinking output.

2. The mobile device of claim 1, further comprising:
a voltage detector configured to detect a voltage output from the solar battery.

3. The mobile device of claim 2, wherein
the controller is configured to control the output section based on the output voltage detected by the voltage detector and the illuminance detected by the illuminance detector.

4. The mobile device of claim 1, wherein each of the plurality of outputs is a light-emitting diode.

5. The mobile device of claim 1, wherein
the plurality of light detectors of the illuminance detector are light-emitting diodes configured as said plurality of outputs to emit light to report a predetermined state, and detect the illuminance on a basis of a voltage across the light-emitting diode when the light-emitting diode is not emitting light.

6. The mobile device of claim 1, wherein
the plurality of outputs of the output section are light-emitting diodes.

7. The mobile device of claim 6, wherein
the plurality of light detectors of the illuminance detector are light-emitting diodes configured to detect the illuminance on a basis of a voltage across the light-emitting diode.

8. The mobile device of claim 1, wherein
the illuminance detector is provided on an external surface of the casing at a predetermined angle relative to a plane parallel to the external surface of the casing.

9. A mobile device comprising:
a solar battery having a light-receiving surface provided on a casing of the mobile device;
a voltage detector configured to detect a voltage output from the solar battery;
an illuminance detector, separate from the light-receiving surface, configured to detect an illuminance of light incident on the casing;
an output section configured to output a state of light incident on the light-receiving surface of the solar battery responsive to the illuminance detector; and
a controller configured to control the output section based on the illuminance detected by the illuminance detector, wherein
the light-receiving surface of the solar battery is provided on a first external surface of the casing of the mobile device, and the illuminance detector is provided on a second external surface of the casing of the mobile device, the second external surface being a surface on an opposite side of the casing from the first external surface, and the output section is provided on the second external surface and is illuminated by the controller to indicate that illumination of light incident on the first external surface is inadequate, but that illumination of light on the second external surface is adequate when the voltage output is determined to be less than a predetermined voltage value while the detected illuminance is greater than or equal to a predetermined illuminance value.

10. A mobile device comprising:
a solar battery having a light-receiving surface provided on a casing of the mobile device;
means for detecting an illuminance separate from the light-receiving surface, of light incident on the casing;

means for outputting a state of incident light on the light-receiving surface of the solar battery responsive to the means for detecting an illuminance; and means for controlling the means for outputting based on the illuminance detected by the means for detecting, wherein means for detecting includes a plurality of light detectors provided on a same external surface of the casing as the light-receiving surface of the solar battery so as to detect illuminances at multiple positions in a surrounding area of the light-receiving surface of the solar battery;

the means for outputting includes a plurality of outputs, each at a position corresponding to a respective position of each of the plurality of light detectors to indicate to a user an availability status of solar battery charging light at the respective position, and the means for controlling controls each of the plurality of outputs to be illuminated when an illuminance detected at the position corresponding to the output is greater than or equal to a predetermined value, and controls each of the plurality of outputs to blink when an illuminance detected at the position corresponding to the output is less than a predetermined value so that a combination of blinking and constantly illuminated output is indicative of light availability coming from a relative direction of the constantly illuminated output position towards the blinking output.

* * * * *